United States Patent
Sakita

(10) Patent No.: US 9,625,943 B2
(45) Date of Patent: Apr. 18, 2017

(54) MOBILE KEYBOARD

(71) Applicant: Masami Sakita, San Francisco, CA (US)

(72) Inventor: Masami Sakita, San Francisco, CA (US)

(*) Notice: Subject to any disclaimer, the term of this patent is extended or adjusted under 35 U.S.C. 154(b) by 145 days.

(21) Appl. No.: 14/461,221

(22) Filed: Aug. 15, 2014

(65) Prior Publication Data
US 2016/0048217 A1    Feb. 18, 2016

(51) Int. Cl.
*G06F 3/02* (2006.01)
*G09G 5/00* (2006.01)
*G06F 1/16* (2006.01)
*H01H 13/7057* (2006.01)
*H01H 13/84* (2006.01)
*H04M 1/725* (2006.01)

(52) U.S. Cl.
CPC ........... *G06F 1/163* (2013.01); *G06F 1/1662* (2013.01); *G06F 1/1681* (2013.01); *G06F 3/0202* (2013.01); *G06F 3/0219* (2013.01); *H01H 13/7057* (2013.01); *H01H 13/84* (2013.01); *H01H 2221/088* (2013.01); *H01H 2223/04* (2013.01); *H01H 2223/044* (2013.01); *H04M 1/7253* (2013.01); *H04M 2250/18* (2013.01)

(58) Field of Classification Search
CPC ...... G06F 1/163; G06F 1/1662; G06F 1/1681; G06F 3/0219; G06F 3/0202; H01H 13/7057; H01H 13/84; H01H 2223/044; H01H 2223/04; H01H 2221/088; H04M 1/725; H04M 1/7253; H04M 2250/18
See application file for complete search history.

(56) References Cited

U.S. PATENT DOCUMENTS

| | | | | |
|---|---|---|---|---|
| 5,305,181 A | * | 4/1994 | Schultz | B60R 11/02 345/168 |
| 6,005,496 A | * | 12/1999 | Hargreaves | G06F 3/0202 341/22 |
| 7,083,342 B2 | | 8/2006 | Griffin | |
| 8,687,354 B2 | | 4/2014 | Uchiyama et al. | |
| 2003/0030595 A1 | * | 2/2003 | Radley-Smith | A44C 5/0007 345/1.3 |
| 2004/0208681 A1 | * | 10/2004 | Dechene | G06F 1/1626 400/472 |
| 2006/0034042 A1 | * | 2/2006 | Hisano | G06F 1/1616 361/679.04 |
| 2011/0060590 A1 | * | 3/2011 | Katae | G10L 13/10 704/260 |
| 2013/0257769 A1 | * | 10/2013 | Sheik-Nainar | G06F 3/0488 345/173 |

* cited by examiner

*Primary Examiner* — Andrew Sasinowski
*Assistant Examiner* — Brent D Castiaux

(57) ABSTRACT

The computer keyboard operable in motion includes keys and control circuitry, and communication means to connect the keyboard to an in-motion operable mobile computer. The keyboard has one key column for the thumb; one key column for the index finger; and one key column for the middle finger; one key column for the ring finger; one key column for the little finger. The keys on which the tips of the fingers rest at the same time do not form a straight row of keys. The keyboard enables not only touch typing but also voice/key interface mode operation of the smartphone to which the keyboard is connected. In the voice/key interface mode, the computer uses voice and the user uses key inputs to interact each other.

48 Claims, 22 Drawing Sheets

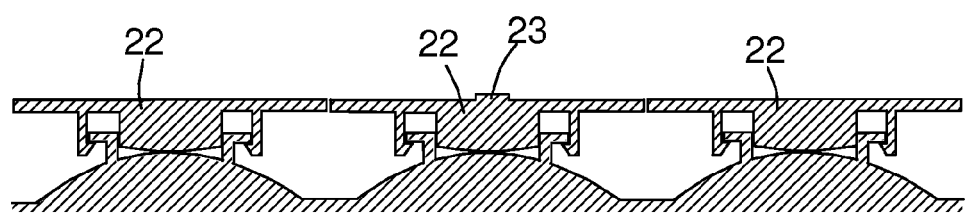
Fig. 3-A
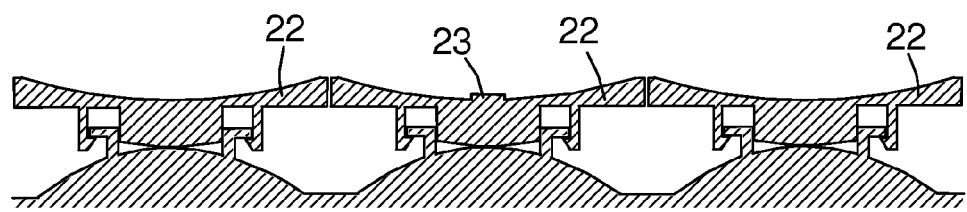
Fig. 3-B

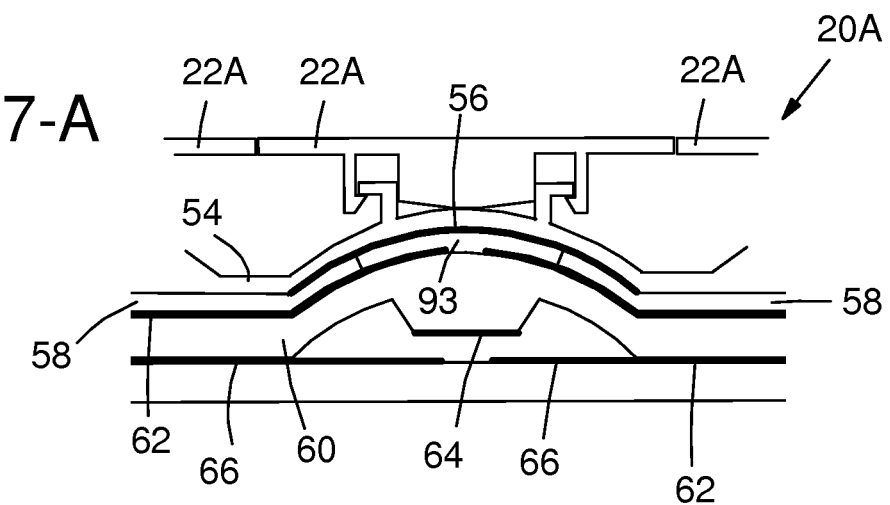
Fig. 7-A
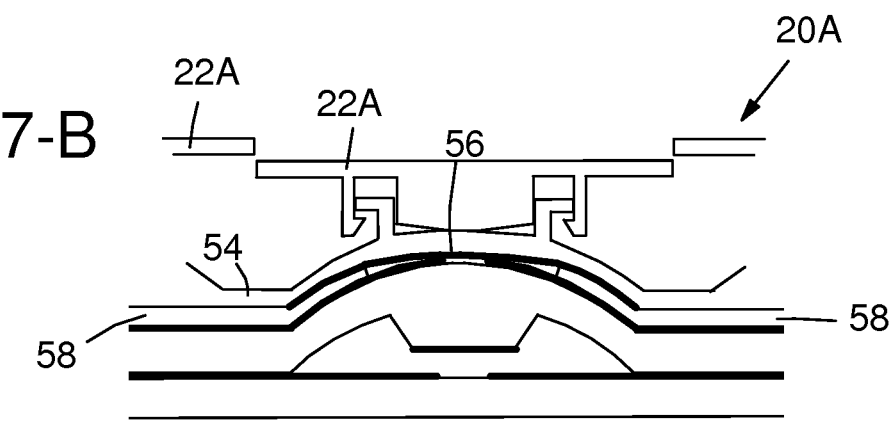
Fig. 7-B
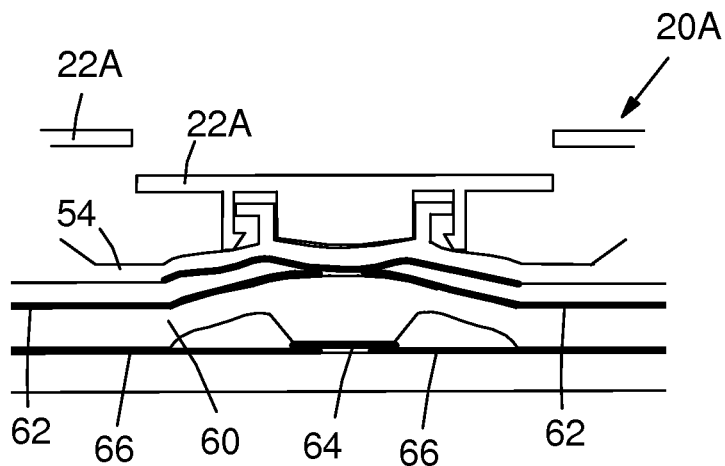
Fig. 7-C

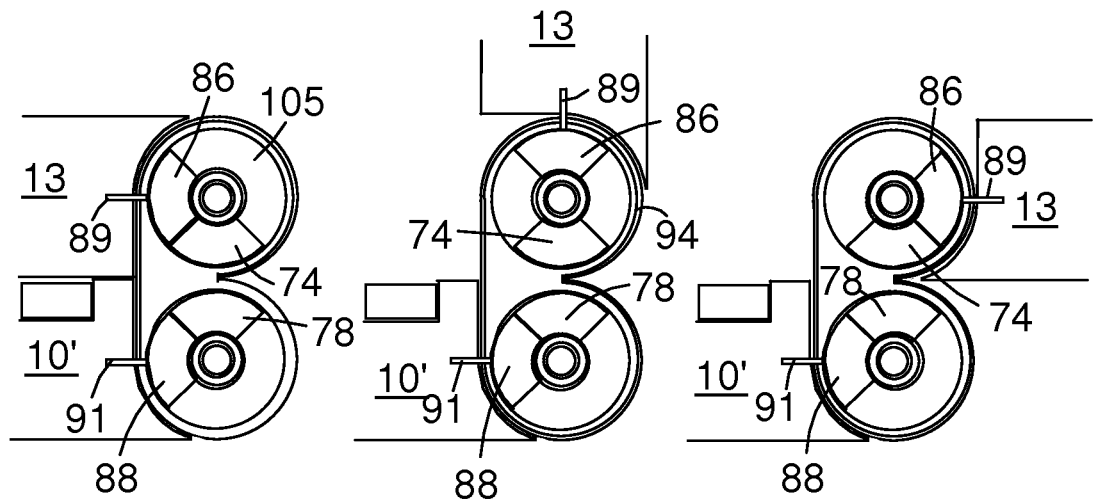
Fig. 22-A  Fig. 22-B  Fig. 22-C
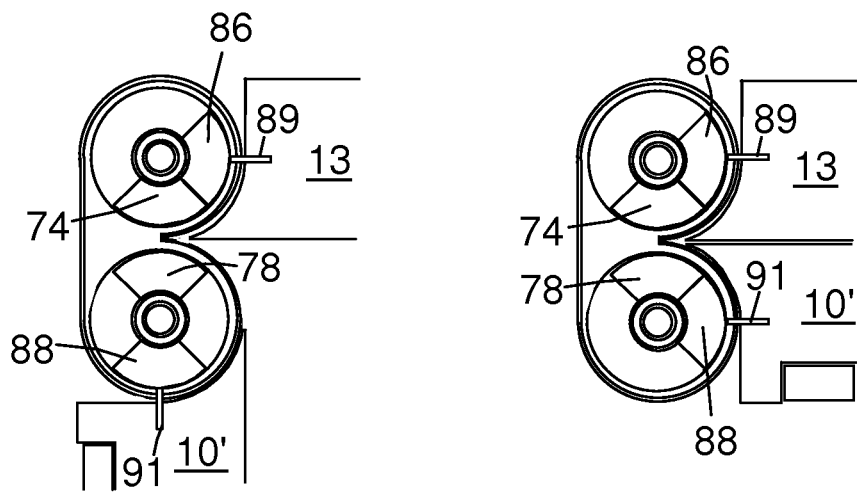
Fig. 22-D  Fig. 22-E

MOBILE KEYBOARD

FIELD OF THE INVENTION

This invention relates generally to a computer keyboard that is operable in motion (or operable while the user is physically moving).

BACKGROUND OF THE INVENTION

The popularity of the smartphone has spread worldwide in recent years, and for many the smartphone has become a necessity in daily life. The smartphone has added so much to life in general, but is causing some problems also. Most people will agree in that the biggest problem we see with the popularity of the smartphone is rampant occurrences of the "walking while looking at the smartphone screen" phenomenon observed daily everywhere in the world. The core of the problem is the user interface of the smartphone that generally requires the user to operate the smartphone in the view/touch interface mode, in which the user views the display screen and touches or swipes it to navigate/operate it.

Currently available alternative user interface systems that alleviate the problem of having to watch the display screen of the smartphone include the voice/voice interface in which the smartphone and the user both use voice to interact each other as seen in voice assistance systems such as Apple's Siri, Google's Google Now, Microsoft's Cortana, and Blackberry's Blackberry Assist. Though these interface systems do not require looking at the display all of the time, because they work within a larger visual/touch interface environment, operation of the smartphone completely without looking at the display screen is generally impossible. Besides, the voice input can be inaccurate in some cases, and cannot be used in the environment where other people are around in close vicinity like in a crowded train.

This inventor believes that the way to completely free the smartphone user from the need to watch the display screen (as we experience while we are walking) is to equip the smartphone with a keyboard that enables touch typing, in which the user does not have to watch the keyboard to know which function or a character is assigned to each key. By adopting such a keyboard in the smartphone that is equipped with the voice output software and applications, we will be able to create the voice/key interface, in which the smartphone uses voice and the user uses key inputs to interact each other. If applications, for example, such as Facebook and Twitter, are made operable under the voice/key interface mode, the user should be able to access those applications without having to watch the smartphone's display screen. In the keyboard operable in such a system, keys are assigned not only characters and ordinary functions we see on the top surfaces of the keys of ordinary keyboards but also logos that represent application icons.

It is this inventor's opinion that the keyboard that enables touch typing will not only able to prevent "looking at the display screen while walking on the street," but also able to create a productive work environment anywhere outside the worker's office by enabling the user use the smartphone with specially designed goggles for office work and the cloud computing service.

OBJECTS OF THE INVENTION

An object of this invention is the provision of an in-motion operable keyboard that enables touch typing without much effort not only with letter keys but with other types of keys.

An object of this invention is the provision of an in-motion operable keyboard that is able to efficiently function in the voice/key interface mode.

An object of this invention is the provision of an in-motion operable keyboard that helps the user in finding the character and functions assigned to the key while touch typing.

An object of this invention is the provision of an in-motion operable keyboard that is able to create, when used in conjunction with a smartphone and specially designed display goggles for office work, a virtual office environment that is comfortable to operate anywhere in any manner the user chooses, including sitting on a park bench or lying on a blanket on the sunny beach.

SUMMARY OF THE INVENTION

The preferred embodiment of the mobile computer keyboard operable in motion includes keys and control circuitry; communication means that connect the keyboard to the smartphone (or any computer if so desired); a battery if required; and a casing. The keyboard is designed to be operated by one hand while the other hand is holding it. The keyboard may be a separated device from the smartphone and operated in conjunction with a smartphone (even though it should be operable with any other types of computer) or is a part of a smartphone. The smartphone with which the keyboard is operated together includes software that enables voice/key interface, in which the computer uses human-like voice and the user uses key inputs to interact each other.

The keys are a tactile (or perceived by touch) type and large enough for the user to be able to rest his/her fingers on them without touching neighboring keys; keys are arranged based on a column-based method instead of the traditional row-based arrangement method. In the column-based method of key arrangement, each key column is assigned to (with intent to be used by) a specific finger; lateral arrangement of the keys generally reflects physical characteristics of the human hand; namely, the keys touched by the fingers and the thumb at the same time while in the resting position do not form a straight row; and keys in a key column are arranged with a small space between them and may have a shallow groove that extends along the key column so that the tip of the finger and the thumb when applicable should be able to smoothly slide on the top surface of the keys along the key column.

In the example key arrangement shown in the drawings, the keyboard has one key column for the thumb; one key column for the index finger; one key column for the middle finger; one key column for the ring finger; and one key column for the little finger. The key columns are five to ten keys long in the example key arrangement.

Top surfaces of the keys in one of the key columns are made to have a distinguishable marking or a shallow groove that extends along the key column so that the user will be able to distinguish the key column from other key columns; and the base key in each key column on which the finger rests is made to have a tactile (or perceptible by touch) marker.

The keyboard is used for making selection of application logos or pictographs, and inputting text, and accordingly, each key has a label that shows a combination of a logo/pictograph and a character/function on its top surface. When the keyboard is operated in the round 1 (logo/pictograph selection mode) of the character/function assignment, the user is able to select an application that he/she wants to use by pressing a key that shows a logo of the application on the key surface, or make a phone call or select his/her choice in a multiple-choice questions by pressing numerals, or operate a voice/key sub-mode by pressing a key that shows a pictograph. When the keyboard is operated in the round 2 (text input mode) of the character/function assignment, the user is able to compose a text by pressing keys that represent characters and functions for inputting text. Switching between them is done by pressing a special button for that purpose.

To help the user in finding the character/function or logo/pictograph assigned to the key while he/she is touch typing, the keyboard is equipped with a button (or key) and the smartphone to which the keyboard is connected includes software to pronounce the name of the character/function or logo/pictograph assigned to any of a specified key of the keyboard. To utilize this functionality, the user first presses this button (or key), then, next presses the key in question. Then, the smartphone will pronounce the name of the character/function or logo/pictograph that is assigned to the key in question, and if the key was that of the character/function or logo/pictograph he/she wanted, he/she presses the same key again to input the character/function or execute the corresponding application.

BRIEF DESCRIPTION OF THE DRAWINGS

The above description and other objects and advantages of this invention will become more clearly understood from the following description when considered with the accompanying drawings. It should be understood that the drawings are for purposes of illustration only and not by way of limitation of the invention. In the drawings, like reference characters refer to the same parts:

FIG. 3-A is a longitudinal cross-sectional view of contiguous keys in the same key column;

FIG. 3-B is a lateral cross-sectional view of the keys that belong to different key columns;

FIG. 7-A is a schematic longitudinal cross-sectional view of an alternative key design in a free-standing state;

FIG. 7-B is a schematic longitudinal cross-sectional view of an alternative key design in a state under which the non-tactile switch has closed a switching circuit;

FIG. 7-C is a schematic longitudinal cross-sectional view of an alternative key design in a state under which both the non-tactile switch and the tactile switch have closed both switching circuits;

FIGS. 22-A through 22-E show cross-sectional views of the conductor assembly as the opening angle of the protective cover part against the main part of the keyboard changes.

DETAILED DESCRIPTION OF THE INVENTION

Figure 1:
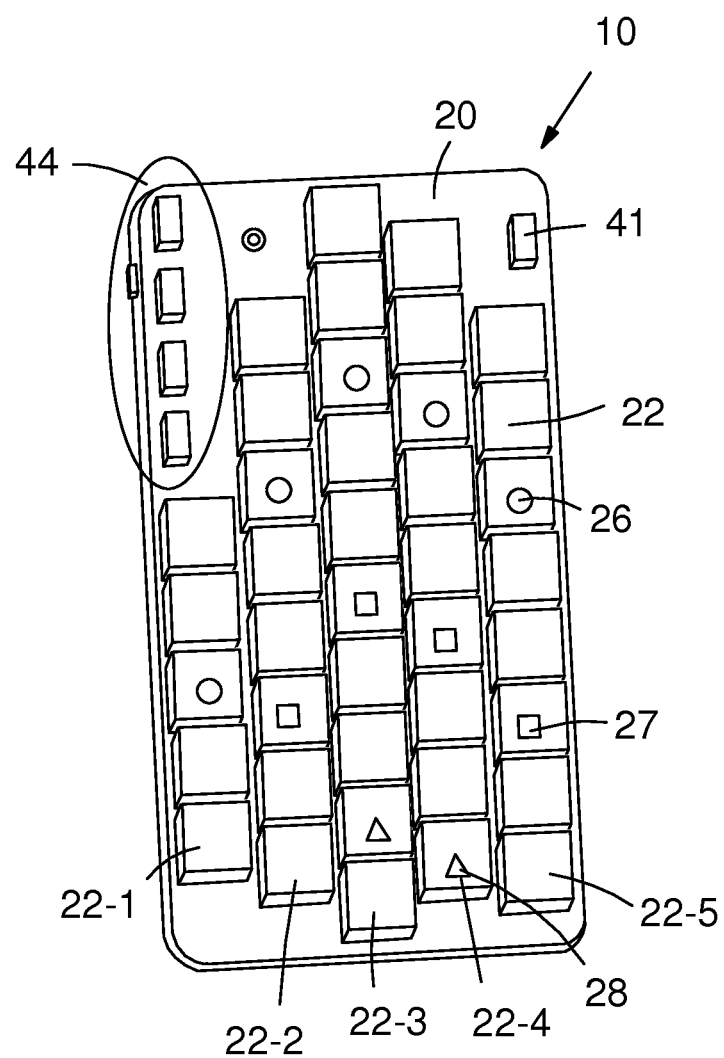
FIG. 1 is a perspective view of the preferred embodiment of the present invention.

In reference to FIG. 1, the preferred embodiment of the computer keyboard 10 that is operable in motion includes a group of keys and control circuitry; communication means that connects the keyboard to a smartphone (or any computer if so desired); a battery if required; and a casing 20. The keyboard is operated (or keystrokes are carried out) by one hand while the other hand is holding it. The keyboard may be an independently carried unit that is used in conjunction with a smart phone carried in a close vicinity of the keyboard, or may be attached to a smartphone as a part of a smartphone itself. The smartphone to which the keyboard is connected includes software that enables voice/key interface, in which the computer uses human-like voice and the user uses key inputs to interact each other.

The keyboard is equipped with a set of buttons 44 including (1) a button to switch the keyboard on or off; (2) a button to switch between round 1 and round 2 of the character/function assignments to the keys; (3) a button that enables the smartphone to which the keyboard is connected read out a character/function or word that has been just inputted; (4) a button to control the voice level; and (5) a button to activate the voice/voice interface mode including a voice assistant system such as Apple's Siri, Google's Google Now and Microsoft's Cortana, or Blackberry's Blackberry Assist. The keyboard may also have an earphone/microphone plug for various purposes, and an LED light to show notifications in an independently carried keyboard.

The keys are a tactile (or to be perceived by touch) type and large enough for the user to be able to rest his/her fingers on them without touching neighboring keys; the keys are arranged to generally reflect physical characteristics of the human hand, and each of the longitudinally extending key columns is assigned to a specific finger, which leads to the key arrangement based on a column-based method wherein the keys on which the fingers rest at the same time while the fingers are not in typing motion do not form a straight row whereas in the traditional row-in the traditional row-based arrangement method, the keys on which the fingers rest at the same time form a straight row.

Figure 2:
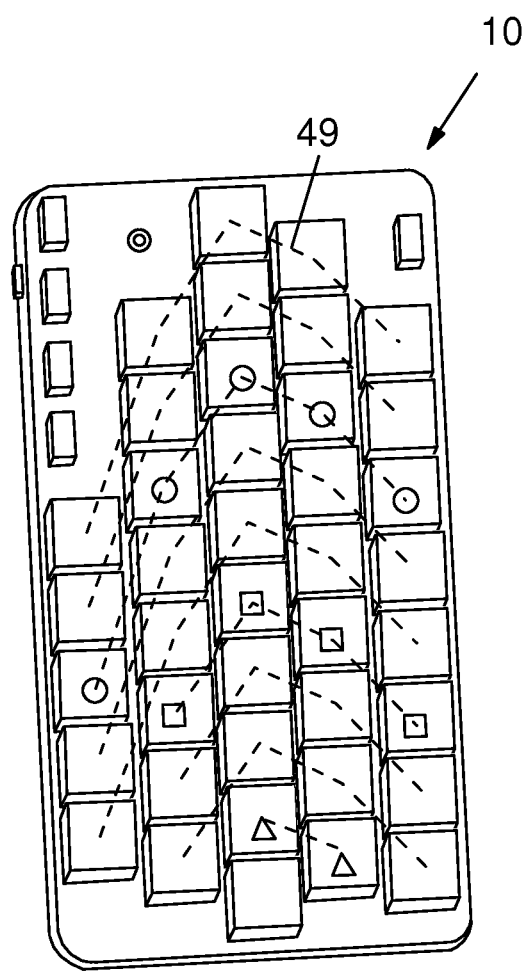
FIG. 2 is a perspective view of the preferred embodiment with broken lines, each of which connects a group of keys on which the thumb and fingers (or only fingers in keys closer to the proximal end of the keyboard) are laid at the same time.

The neighboring keys 22 in the same key column have a small space between them and top surfaces of the keys in the same key column may have a shallow groove that extends along the key column so that the tip of the finger should be able to smoothly slide on the top surface of the keys along the key column as shown in FIGS. 3-A and 3-B. In order to depict the design concept of the column-based key arrangement, FIG. 2 shows five broken lines 49 (in the distal ends of the key columns) each of which connects a group of imaginary lateral series of keys on which the thumb and fingers are to be laid at the same time while the fingers are not in typing motion, and in the rest of the keys each broken line 49 connects a group of imaginary lateral series of keys on which only fingers are to be laid at the same time while the fingers are not in typing motion.

In the example key arrangement shown in FIG. 1, the keyboard has one key column 22-1 for the thumb; one key column 22-2 for the index finger; one key column 22-3 for the middle finger; one key column 22-4 for the ring finger; and one key column 22-5 for the little finger, and the key column is five to ten keys long.

Top surfaces of the keys in one of the key columns are made to have a distinguishable marking 23 as shown in FIGS. 3-A and 3-B or an extra groove that runs along the center of the key column (not shown in FIG. 3-B) so that the user will be able to distinguish the key column from other key columns. This chosen key column may be that assigned to the middle finger or that assigned to the index finger. The base key in each key column on which each finger rests is made to have a tactile (or perceptible) marker. In the example key arrangement shown in FIG. 1, the base keys are the third keys from the distal end of the key columns. In addition, selected keys (for example, third, sixth and ninth keys, 26, 27, and 28 from the distal end of the key columns) of the key columns may have a tactile (or discernible by touch) marker as shown in FIG. 1.

Figure 4:
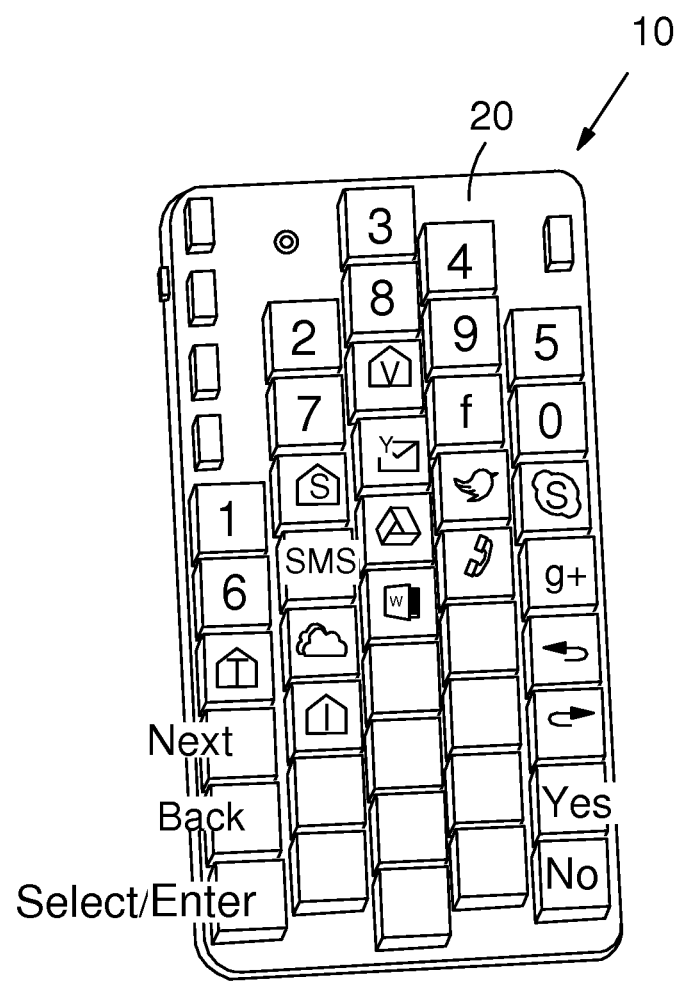
FIG. 4 is a perspective view of the preferred embodiment with an example arrangement of logos/pictorials etc. used in the voice/key interface operation (in round 1 of the character/function assignments to the keys)
Figure 5:
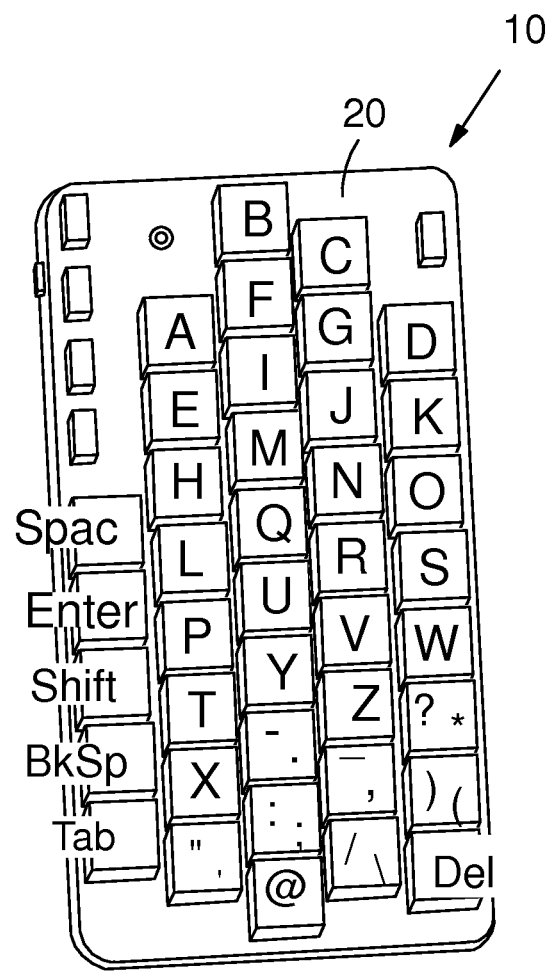
FIG. 5 is a perspective view of the preferred embodiment with an example arrangement of characters/functions etc. (in round 2 of the character/function assignments to the keys)

The keyboard is used for making selection of application logos or pictographs, and inputting text, and accordingly, each key has a replaceable label that shows a combination of a logo/pictograph and a character/function on its top surface. When the keyboard is operated in the round 1 (logo/pictograph selection mode) of the character/function assignment, the user is able to select an application that he/she wants to use by pressing a key that shows a logo of the application on the key surface, or the user is able to input numerals for making a phone call or selecting his/her choice in a multiple-choice questions, or the user is able to operate a voice/key sub-mode by pressing a pictograph. When the keyboard is operated in the round 2 (text input mode) of the character/function assignment, the user is able to compose a text by pressing the keys that represent characters and functions for inputting text. Switching between them is done by pressing a special button 41 for that purpose (see FIG. 1). Example character/function assignment to the keys is shown in FIGS. 4 and 5. Note that in a real keyboard, a pictograph/logo on each key shown in FIG. 4 and a character/function on each key shown in FIG. 5 both appear on the top surface of each key.

In reference to FIG. 4, the characters and functions that are assigned to the keys for the voice/key interface include "Next," "Back" and "Select/Enter"; numerals 0 through 9; the "u-turn pictograph" that indicates "go back to the previous page"; the "u-turn forward pictograph" that indicates "go to the next page"; the "house shaped pictograph that encloses letter T" for the "Voice-Key Talk" sub-mode operation; the "house shaped pictograph that encloses letter S" that is for the "Shortcuts" sub-mode operation; the "house shaped pictograph that encloses the V letter" for the visual/touch interface mode operation; "Yes" and "No"; and pictographs (or logos) of individual applications that is operable in the "Individual Applications" sub-mode. Applications may include Facebook, Twitter, Skype, Google+, Yahoo Mail, One Drive, Google Drive, MS Word, SMS, etc.

When the voice/voice interface is activated by pressing the aforementioned (5) button among the set of buttons 44 (see FIG. 1), the voice/voice interface (such as Siri etc.) supersedes the voice/key interface when the one of the logos or pictographs is selected, and hence the user will end up interfacing with the smartphone with the voice/voice interface that is supported by the smartphone to which the keyboard is connected.

The voice/key interface is an alternative interface made available to the smartphone to which the keyboard is connected. The user is able to use the voice/key interface when it is appropriated or more convenient to use than using the visual/touch interface or the voice/voice interface. Note that, while the user is operating the smartphone in the voice/key interface mode, the smartphone is at the current page and operable (if the display is switched on) in the visual/touch interface mode also.

The voice/key interface mode is operable in three sub-modes. The first sub-mode is called "Individual Applications" that can be started by pressing one of the keys with application logos such as Facebook etc. as shown on the top surface of the keys shown in FIG. 4, or by pressing the key with a pictograph that looks like a house with a letter I inside; the second sub-mode is called "Voice-Key Talk" that can be started by pressing the key that is shown by a pictograph that looks like a house with a letter T inside; and the third sub-mode is called "Shortcuts" that can be started by pressing the key with a pictograph that looks like a house with a letter S inside (see FIG. 4).

In any of the three sub-modes, if the user lets the computer to read out the inputted characters and words by pressing aforementioned button (3) of the group of buttons 44 (see FIG. 1), the computer reads out the inputted character or word as soon as the user presses the space key, the comma key, the period key or the enter key after the user inputs a character or word. If the user finds the inputted character or word is not correct, he/she presses the delete key to delete the inputted letter or word, and then again proceeds with key inputs. If the user wants the computer to read out the contents of what he/she just inputted, he/she must press a special key that has been assigned to let the smartphone read out the whole content of the document the user inputted.

Figure 6:
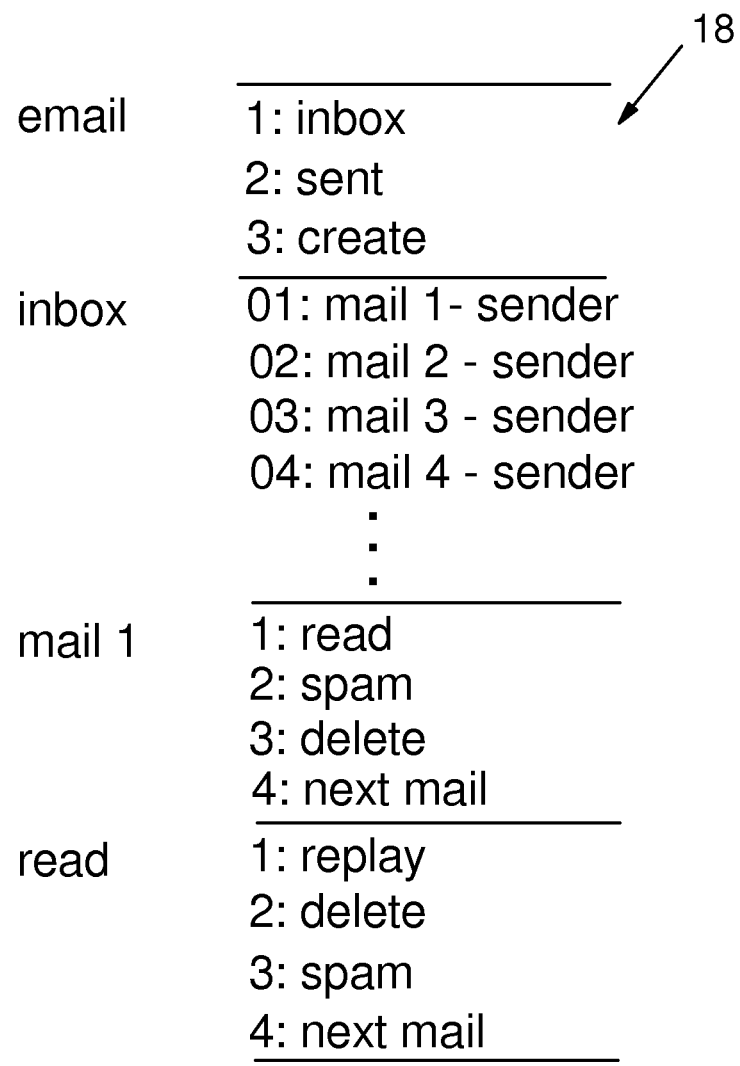
FIG. 6 is a part of an example selection choice tree, in which selectable choices in several stages of a tree branch of the email application are listed.

If the user presses the key with the house like pictograph with a letter I inside to operate "Individual Applications," the computer will start to read available applications' application ID and its name one after another. The user selects the application by inputting the ID number from the list to start using the voice/key interface with the selected application in "Individual Applications." "Individual Applications" works like a fully automated telephone answering system. FIG. 6 shows a part of a selection choice tree 18 of the hypothetical Yahoo Mail service, in which selection choices are listed in a tree-branch form. The selection choice tree 18 is similar to the directory tree that shows files stored in different levels of directories in the computer.

In "Individual Applications," each application has a number of choices in each level, and different number of levels in the selection tree depending on the complexity of functionalities the application provides. For example, Yahoo Mail service may have a total of three choices in the first level such as 1: inbox, 2: sent, and 3: create, and four levels in the selection choice tree in the path up till the level shown by "read" in FIG. 6.

The second sub-mode that is called "Voice-Key Talk" may be said as the voice/key interface equivalent of Siri, Google Now, Cortana or Blackberry Assist as this sub-mode works in a similar manner to the voice/voice interface seen in these voice assistance systems. When the "voice-key talk" sub-mode of the voice/key interface starts, the user types in keywords that relate to what he/she wants the smartphone to do. For example, if the user wants the smartphone to help him/her navigate to the SF International Airport from his/her apartment in Marina District in San Francisco, he/she may input "direction to," and "SF International Airport," or in a short sentence such that "Give me the direction to SF International Airport" before he/she starts from home. In response, the smartphone may answer in the interrogative mood if the smartphone is not sure what it is supposed to do. For example, the smartphone may ask "Are you driving or taking BART?" For this question, if the user inputs "driving," the smartphone may answer in the imperative mood. For example, the smartphone may say, "Go straight on Van Ness southbound to Central Freeway," and the user follows the direction given by the smartphone till the next spot where the smartphone will give additional directions. The location of the user is recognized by the GPS while the smartphone is being operated.

The third sub-mode of the voice/key interface that is called "Shortcuts" uses shortcuts that take the user to a specific point that the user wants to reach in "Individual Applications" without going through multiple levels of choices in the choice tree. If the user selects "Shortcuts," the smartphone will take the user to the home page of "Shortcuts," which shows a list of shortcut ID numbers and their descriptions side by side. There, the user inputs the ID number of the shortcut he/she is interested in. For example, 0003 that may represent the shortcut for pressing 03, 01, and 01 in a sequence in "Individual Applications," and may bring the smartphone directly to the inbox page of Yahoo Email. The user could press a series of shortcut IDs at a time so that different shortcuts can be processed one after another in a series as each is finished. It is also possible to use "Shortcuts" by giving shortcut ID's for macros created by the user for Microsoft Office software.

Shortcuts can be inputted while in "Individual Applications." It means that when the smartphone voice is reading out choices of the first level, the user could input a shortcut ID instead of the numeral that represents one of the choices. As described above, while in each application, the current page view of the application is shown on the display, and the view/touch interface is operable simultaneously.

Software that enables the voice/key interface mode operation includes text-to-speech software, voice synthesis software, and a set of voice/key interface ready applications. In addition, "Voice-Key Talk" uses software that enables the smartphone to carry out the man-machine interaction. Voice/key interface ready applications are ordinary visual/touch applications such as Facebook etc. that reside in the smartphone and have been made to work in the voice/key interface mode. Voice/key interface ready applications can be prepared by the applications developers or the developer of the voice/key interface system, and can be added as the time progresses. Each application has a permanent ID number that is assigned by the developer of the voice/key interface system at the time of registering the "voice/key interface ready" application, and a user defined ID number that is assigned by the user of the smartphone.

The applications used in the voice/key interface mode will be managed by software that resides in the cloud storage by the office/laptop computer and/or in the smartphone to which the keyboard is connected. This software will be able to handle such things as adding new applications; updating the voice/key portion of the applications; their assigning applications to the keys; deleting old applications; and creating of shortcut ID's and shortcut list, etc.

Even though character labels are attached to the top surfaces of all of the keys, it may be unlikely that all users remember the locations of all of the characters and/or functions assigned to all keys. To help the touch typing user find the character/function or logo/pictograph assigned to a specific key, the keyboard is equipped with a button (or a key) 41, and the smartphone to which the keyboard is connected includes software to pronounce the name of the character/unction or logo/pictograph currently assigned to any of the keys on the keyboard. To utilize this functionality, first, the user presses the button (or a key) 41, and then next, presses the key in question. Then, next, the smartphone pronounces the name of the character/function or logo/pictograph that is assigned to the key at the time, and if the user finds that the key was assigned the character/unction or logo/pictograph he/she wanted, he/she presses the same key (in question) again to input the character/function or logo/pictograph.

In alternative design A (a perspective view not presented), the keyboard includes a special key design that utilizes what we call the dual-switch key design, in which the key is equipped with two different electric circuits, each of which is closed off when the key is pressed by a force of different level of each other. If the user presses the key with a light force, the software installed in the smartphone to which the keyboard is connected will pronounce the name of the character/function or logo/pictograph that is assigned to the key, and if the user presses the key with a stronger force (or a normal force) in a short enough interval after the first switch closed off the first circuit, the smartphone will execute input of the character/function or the logo/pictograph without pronouncement.

In this design, the key 22A and its vicinities includes a non-conductive top layer 54, non-tactile switch on top and tactile switch at the bottom as shown in FIGS. 6-A through 6-C. FIG. 7-A shows the key's free-standing state; FIG. 7-B shows the case in which the non-tactile switch has closed the circuit as the key 22A is pressed by a light force; and FIG. 7-C shows the case in which both the non-tactile switch and the tactile switch have closed the circuits as the key 22A is pressed by a stronger (or normal) force.

The non-tactile switch is a flat-panel membrane switch that includes the top layer 54 of non-conductive material with a conductive element 56 printed on the switch portion of its bottom surface; the middle layer 60 of non-conductive material with an electric circuit 62 printed on its upper surface; and a spacer layer 58 of non-conductive material in between the two layers of non-conductive material with an opening 93 in the switch portion. When the user presses the key 22A lightly, the conductive element 56 at the switch portion of the surface layer 54 touches and closes the circuit 62 as shown in FIG. 7-B, and that triggers the pronunciation of the name of a letter/function or a logo/pictograph.

The tactile switch includes a dome switch, in which the flat middle layer 60 transforms to become a dome-shaped switch at the switch area. When the user presses the key 22A with a normal force, the dome is compressed, and the conductive element 64 that is printed at the bottom of the dome closes off the electric circuit 66 that is attached to the top surface of the bottom layer 68 of non-conductive material as shown in FIG. 7-C, and executes the input of the character/function or execute the corresponding application to the logo/pictograph that was pronounced when the key was pressed lightly. If the tactile switch is pressed within a short enough time span after the pressing of the first switch (or before pronunciation of the character and the like start to take place) pronunciation of the name of a character/unction or logo/pictograph can be suppressed, and execution of the character/unction or logo/pictograph input proceeds.

Figure 8:
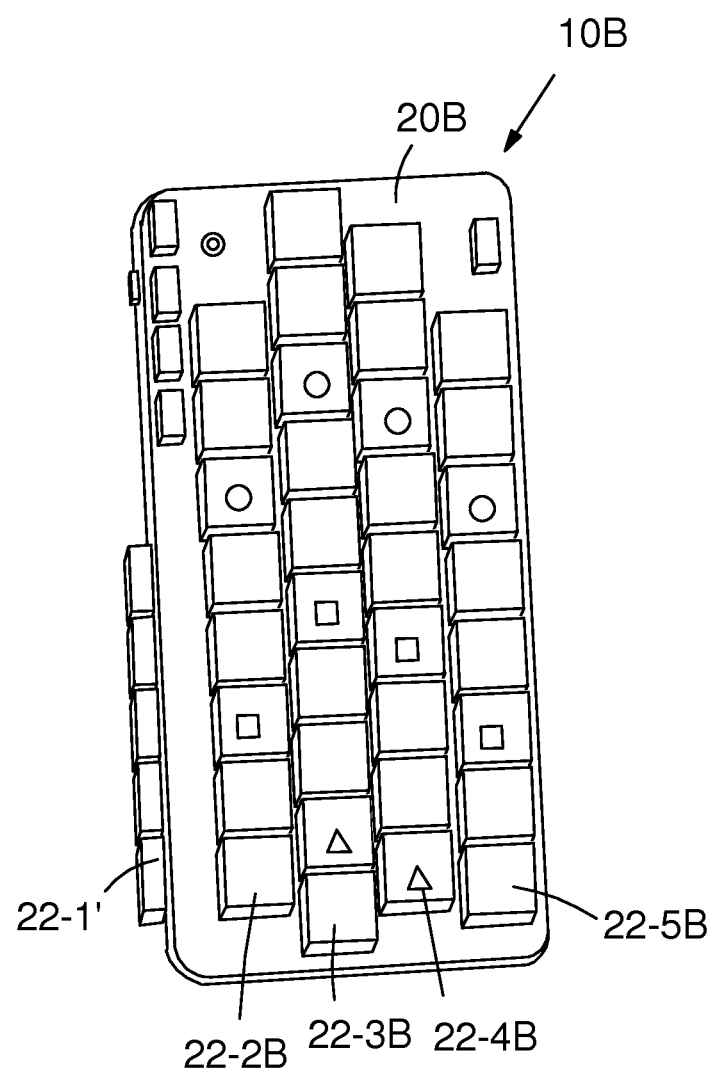
FIG. 8 is a perspective view of alternative embodiment B of the present invention.

In reference to FIG. 8, alternative embodiment B of the keyboard includes only four key columns 22-2B, 22-3B, 22-4B, and 22-5B, each of which is assigned to a finger, and a plurality of buttons 22-1' on the side (of the keyboard) that is closer to the thumb. These buttons 22-1' are assigned to the thumb as replacements for the keys assigned to the thumb.

Figure 9:
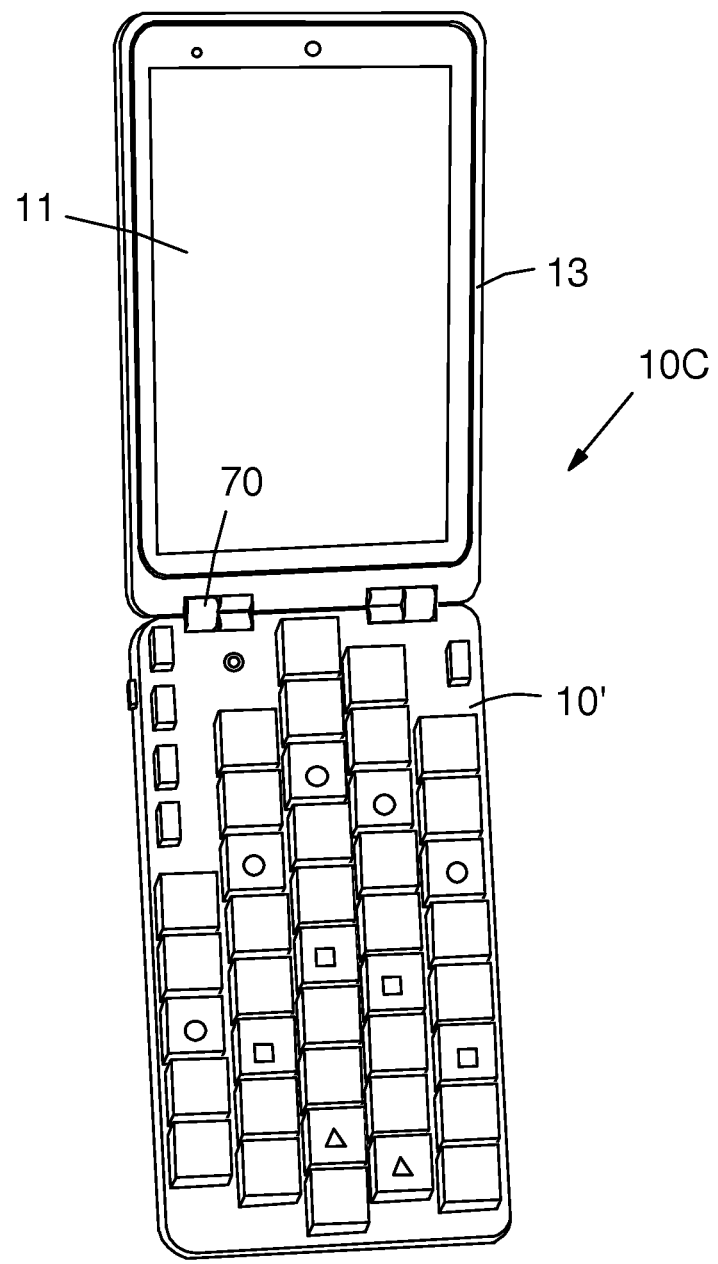
FIG. 9 is a perspective view of alternative embodiment C of the present invention.

FIG. 9 shows a perspective view of an alternative embodiment C of the keyboard, which includes a main body of the keyboard 10', a protective case 13 for a smartphone 11. A smartphone 11 is snapped into the protective case 13. The main body of the keyboard 10' also functions as the front cover of the protective case 13. The smartphone and the main body of the keyboard are physically connected by double-jointed hinges 70, and electronically connected by a computer bus port of the smartphone 11 and the pins (that are plugged into the computer port) of the computer bus of the smartphone case 13.

In this design, the keyboard may be used in two physical modes, but in three ways: when the smartphone display is opened with the angle of less than 180 degrees, the user is able to look at the display of the smartphone and use the keyboard at the same time; and when the keyboard is opened 360 degrees, and the keyboard and the smartphone display are back-to-back of each other, the user is able to use the display side alone for visual/touch interface mode operation, and the keyboard side alone for the voice/key interface mode operation.

Figure 10:
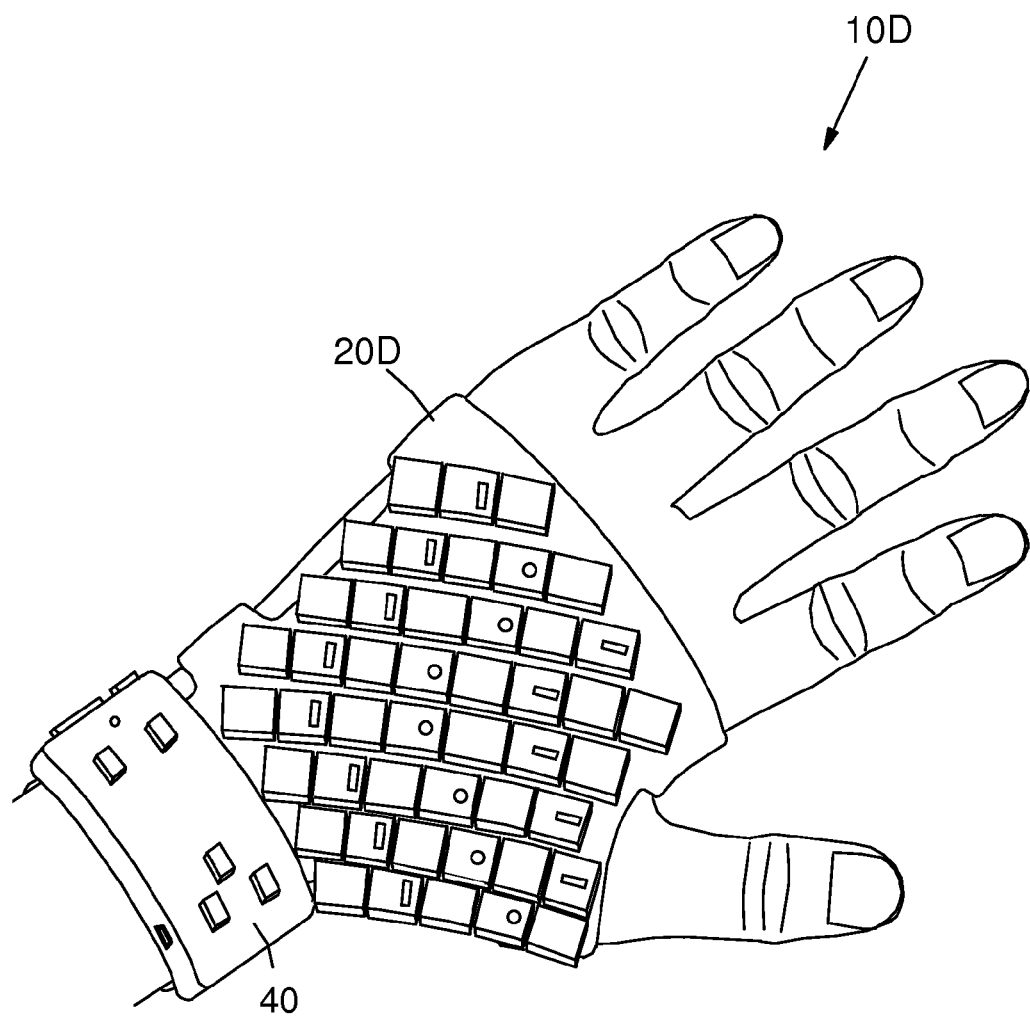
FIG. 10 is a dorsal side perspective view of alternative embodiment D of the present invention as it is worn on the hand.
Figure 11:
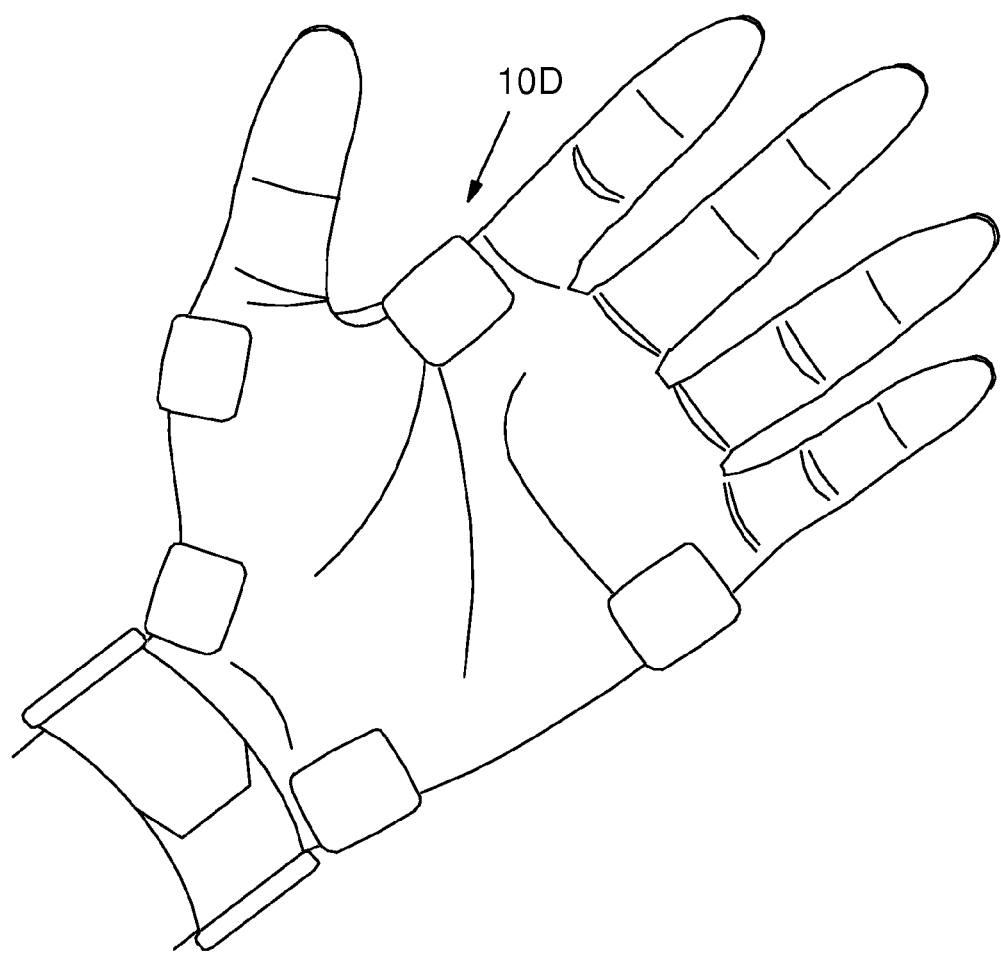
FIG. 11 is a palmer side perspective view of alternative embodiment D of the present invention as it is worn on the hand.
Figure 12:
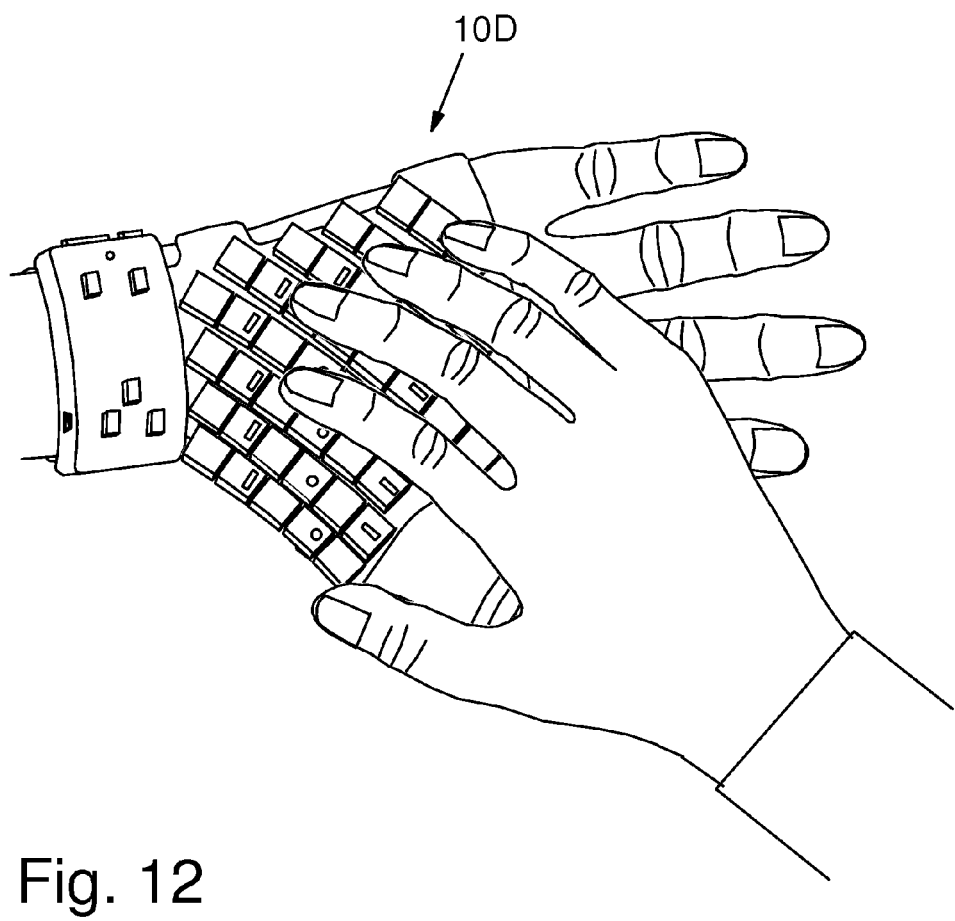
FIG. 12 is a dorsal side perspective view of alternative embodiment D of the present invention as it is worn on the hand to show the way the keyboard is held while in use.

As shown in FIGS. 10 and 11, alternative embodiment D of the in-motion operable computer keyboard includes keys and control circuitry and keyboard casing 20D, and is worn on the back of a hand; a communication means that connect the keyboard to the smartphone; and a casing 40 that encloses a battery etc. This wearable version of the in-motion operable keyboard is operated with the hand that does not wear the wearable computer as shown in FIG. 12. The casing 20D is made of a flexible material so that the keyboard will fit well to the back of the hand of the user. In order to produce best fit wearable version of the in-motion operable keyboard is custom made using the 3-D measurement technology and the 3-D printing technology.

In the production process of this embodiment, first, the user who wants to buy the wearable keyboard will go to the store where this wearable version of the mobile computer keyboard is sold and has his/her hand scanned by the 3-D hand scanning machine. The 3-D scanning machine is a computer operated box-shaped type optical device with cubic inner space whose inner walls are equipped with a plurality of lens. The buyer of the wearable version of the keyboard puts his/her hand into the inner space and the 3-D scanning machine makes the 3-D measurements of the hand. The store will send the measurement data to the keyboard production factory, and the factory will produce the part of the keyboard that uses custom fitting using the 3-D printing technology.

Mobile Computer Operable in Motion Equipped with the Keyboard

Alternative embodiment E is a mobile computer operable in motion (such as a smartphone or a small tablet) that includes the preferred embodiment of the keyboard; namely, that enables touch typing and is operable in the view/touch interface mode.

Figure 13:
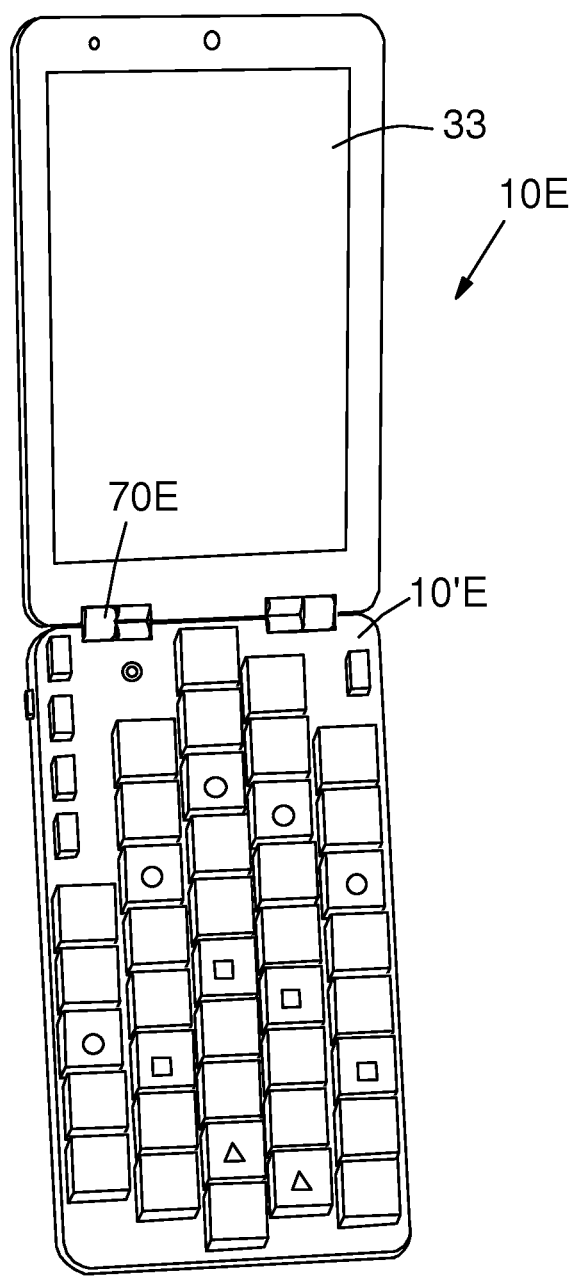
FIG. 13 is a perspective view of alternative embodiment E of the present invention.

In reference to FIG. 13, the embodiment E includes a central processor unit (CPU); random access memory (RAM); a data storage medium; operating system (OS) and application software; a keyboard that includes keys and control circuitry; a casing 20E of main body; a display unit 33; and a battery. The display unit 33 also functions as the front cover of the main body of the mobile computer 10E. The display unit 33 and the casing 20E of the main body of the mobile computer 10E are physically connected by double-jointed hinges 70E, and electronically connected by a computer bus.

This mobile computer operable in motion includes software that enables operation of the computer using the voice/key interface mode, in which the computer uses voice and the user uses key input to interface each other. The software that enables the voice/key interface mode operation includes text-to-speech software, voice synthesis software, and a set of "voice/key interface ready" applications. In addition, the "voice/key talk sub-mode" uses software that enables the smartphone to carry out the man-machine interaction.

This mobile computer is also equipped with software to pronounce the name of the character/function or logo/pictograph that is assigned to any key on the keyboard. To utilize this functionality, the user presses the button or a key, and then next, presses the key in question. Then, next, the smartphone pronounces the name of the character/function or logo/pictograph that is assigned to the key, and if the key was assigned the character/function or logo/pictograph he/she wanted, he/she presses the same key (in question) again to input the character/function or logo/pictograph. The alternative embodiment A that includes the key design shown in FIGS. 7-A through 7-C, also can be used for the mobile computer operable in motion.

The mobile computer as shown in alternative embodiment E (see FIG. 13) is a smartphone version of embodiment C described above. This smartphone (or embodiment E) may be used in two physical modes, but in three ways just in the same manner as done in alternative embodiment C.

Figure 14:
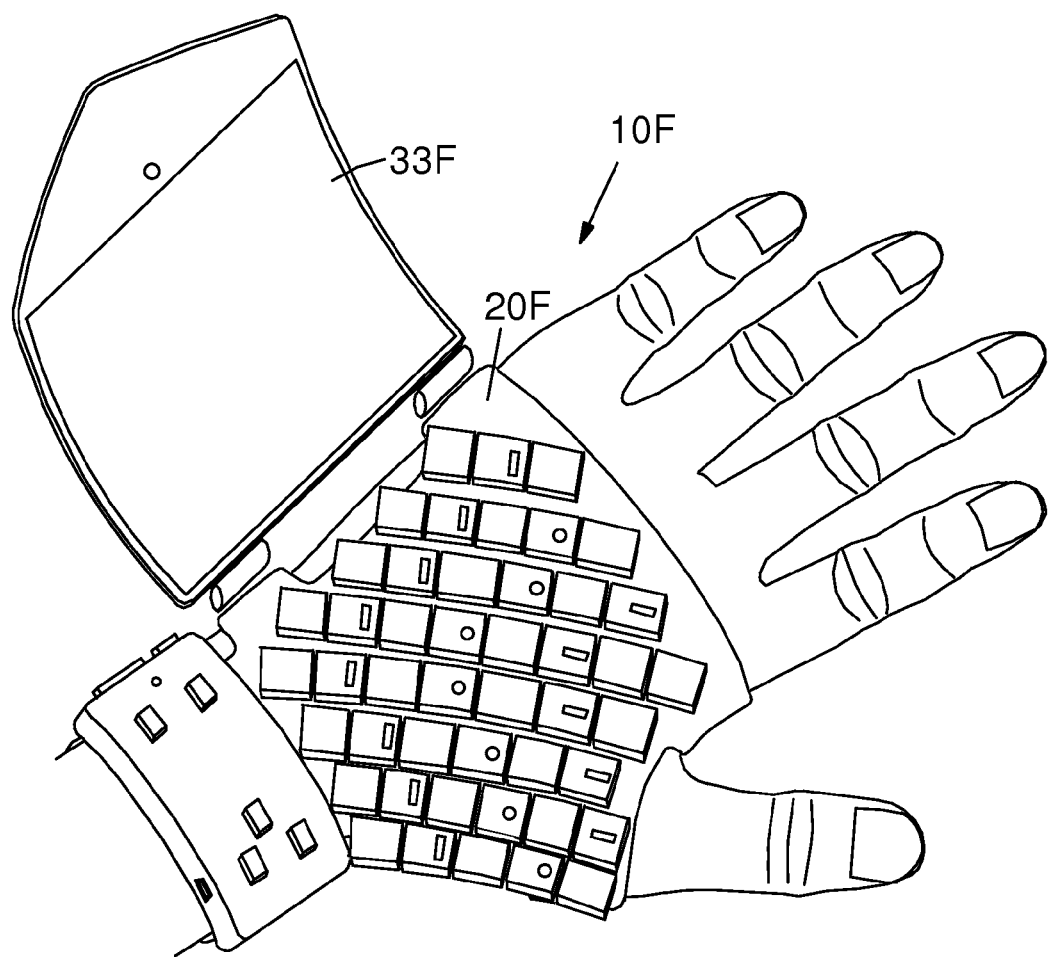
FIG. 14 is a dorsal side perspective view of alternative embodiment F of the present invention as it is worn on the hand.

In reference to FIG. 14, alternative embodiment F is a wearable smartphone that includes all the functionalities of the alternative embodiment E. In the embodiment F, the user is freed from carrying the in-motion operable mobile computer. The casing 20F is made of a flexible material so that the keyboard will fit well to the back of the hand of the user. Just like in alternative embodiment D, in order to produce best fit wearable version of the in-motion operable computer use of the 3-D measurement and the 3-D printing technologies may be considered.

Computer Keyboard not Operable in Motion

As stated above, the primary object of the preferred embodiment of the present invention is the provision of an in-motion operable computer keyboard that enables touch typing without much effort not only with letter keys but with other types of keys. The same object that became the origin of the preferred embodiment also became the origin of the keyboard that is not operable in motion, though the not-operable-in-motion keyboard is used in different environment from that of the in-motion-operable keyboard such that (1) the user is able to look at the display screen while he/she operates the keyboard, and (2) the user operates the keyboard with both hands.

In the design of the keyboard, this embodiment includes two key groups: one for the left hand and the other for the right hand as usually the case in the keyboard for the desktop, laptop, and tablet computers. The basic design scheme of the keyboard, however, including the design details of the keys and the key arrangement; the use of the voice/key interface; and the method of finding the character/function that was assigned to the key used in the preferred embodiment of the keyboard operable in-motion are generally applicable to the embodiment G of the computer keyboard not operable in motion. The following description covers mainly the differences of this embodiment from the preferred embodiment.

Figure 15:
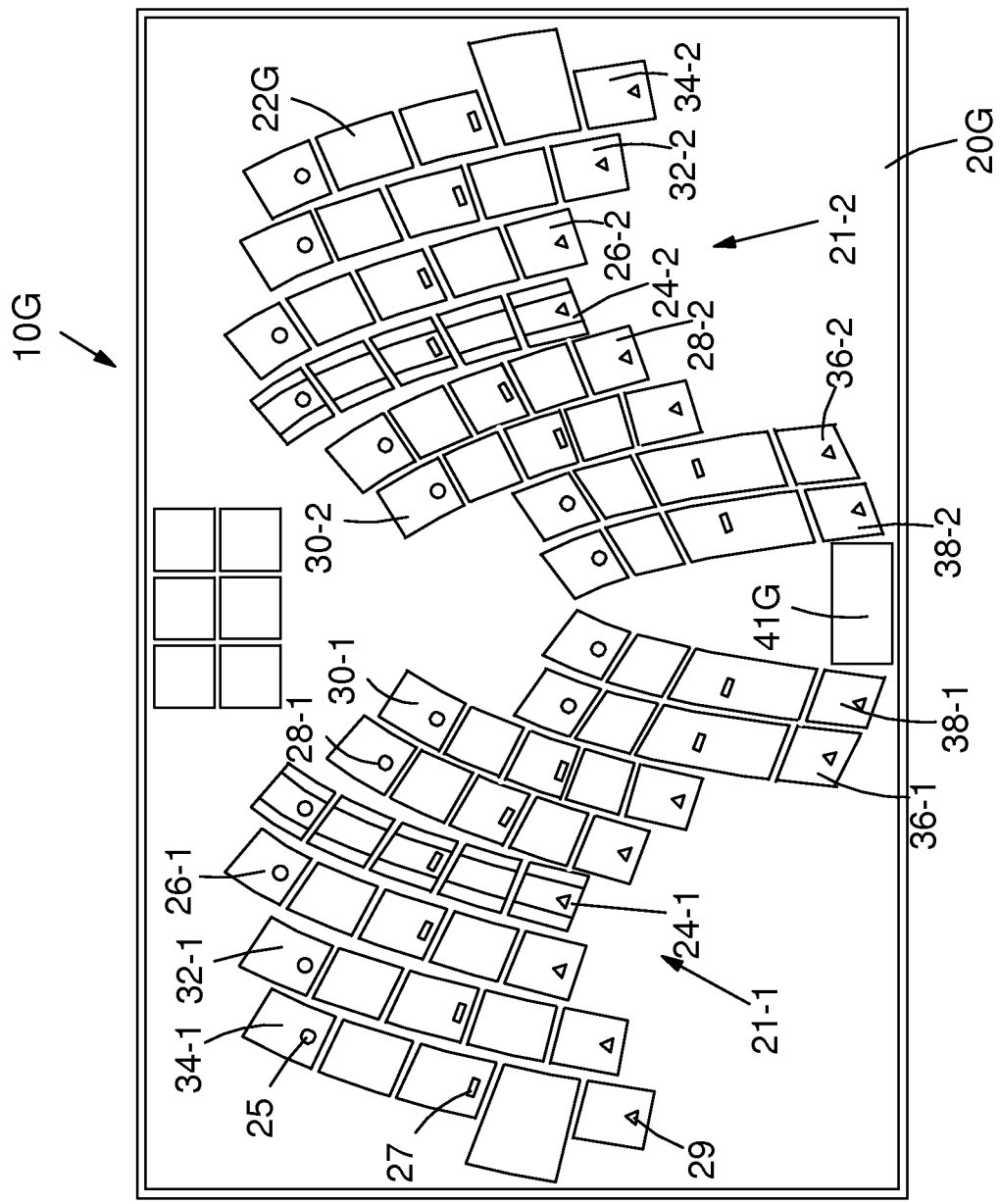
FIG. 15 is a top view of alternative embodiment G of the present invention.

In reference to FIG. 15, the keys 22G used in inputting text; namely, character and function keys (excluding the keys in the numeric keypad and some miscellaneous keys placed separately on the right side of the keyboard seen in most keyboards used with the desktop computer) are enclosed in the casing 200 of the keyboard 10G, and are separated in two key groups 21-1 and 21-2, one used by the left hand and the other used by the right hand, respectively. Each of the key groups includes generally longitudinally inwardly windingly extending eight columns of keys from the proximal end to the distal end. The arrangement of the keys of the two key groups 21-1 and 21-2 are generally symmetric to the center line of the keyboard as shown in FIG. 15.

In the key group for the left hand, there are eight key columns that includes two key columns 36-1 and 38-1 for the thumb; two key columns 28-1 and 30-1 for the index finger; one key column 24-1 for the middle finger; one key column 26-1 for the ring finger; and two key columns 32-1 and 34-1 for the little finger. Similarly, in the key groups for the right hand, there are eight key columns that includes two key columns 36-2 and 38-2 for the thumb; two key columns 28-2 and 30-2 for the index finger; one key column 24-2 for the middle finger; one key column 26-2 for the ring finger; and two key columns 32-2 and 34-2 for the little finger. Each key column assigned to the thumb has four keys; i.e., three ordinary size keys and one double sized keys, and each key column assigned to the finger has five keys.

Figure 16:
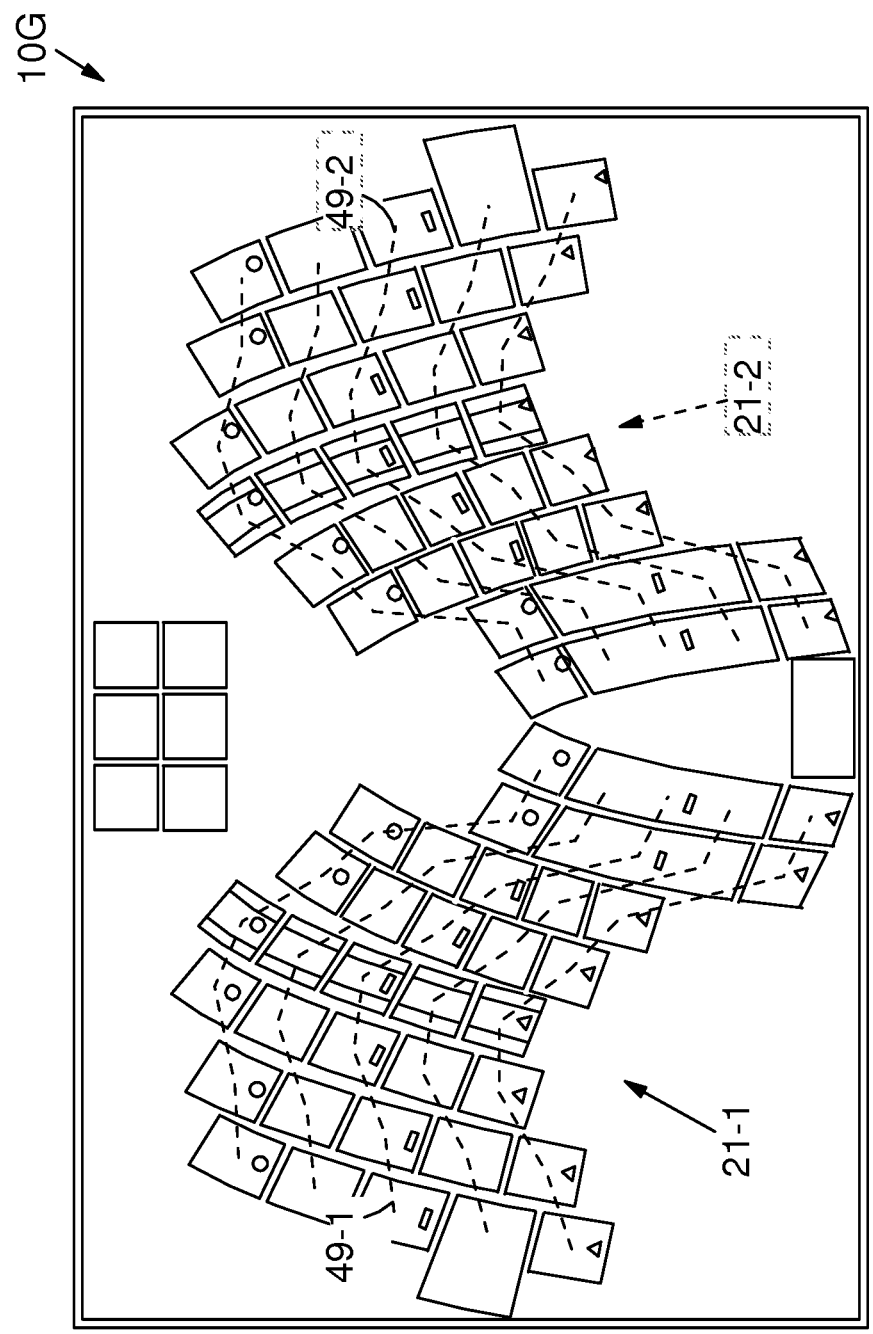
FIG. 16 is a top view of alternative embodiment G of the keyboard with broken lines that connect sets of keys touched by the fingers and the thumbs at the same time.
Figure 17:
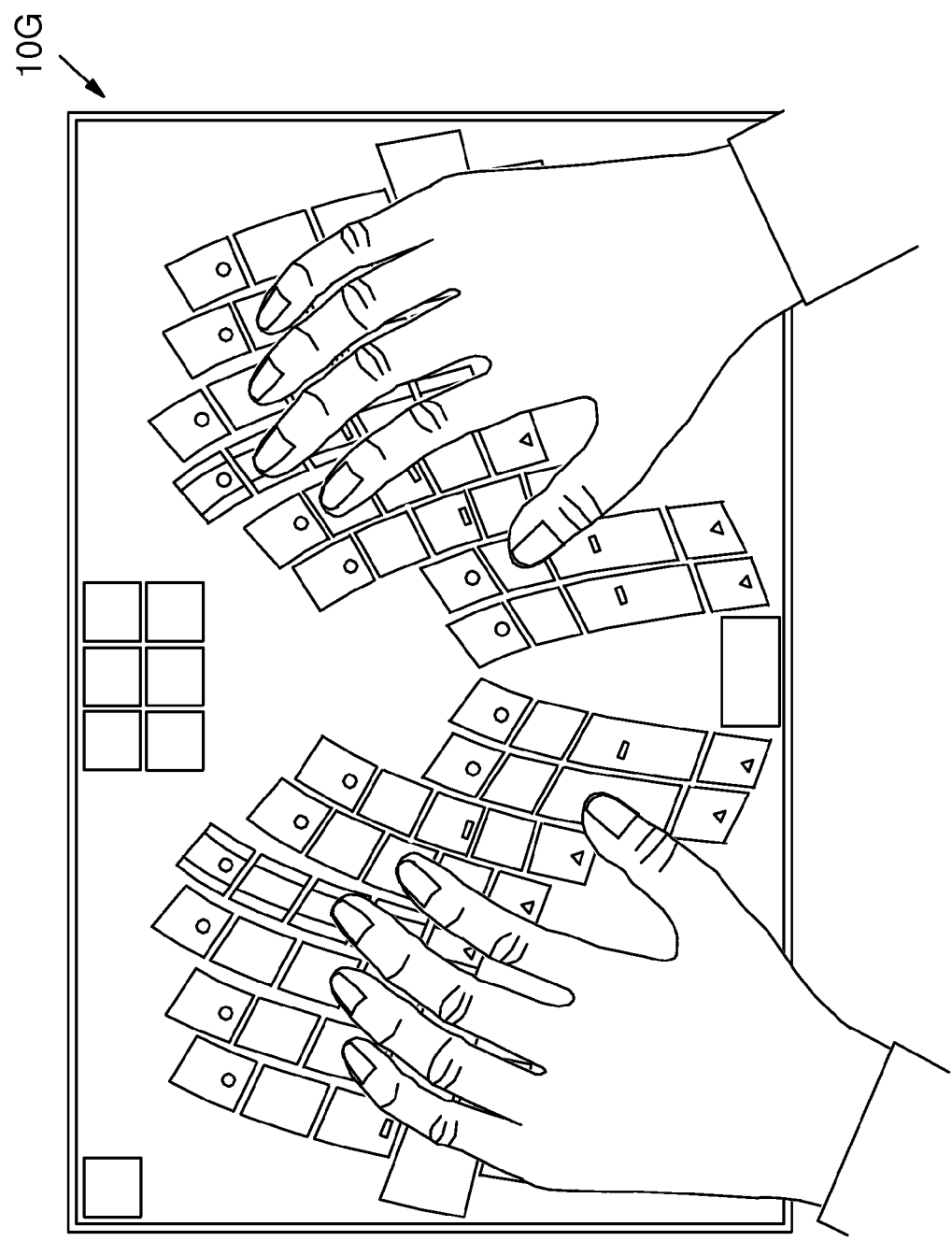
FIG. 17 is a top view of alternative embodiment G of the keyboard, in which the thumbs and fingers of the left hand are laid on the third keys from the distal end of the key columns, and the thumbs and fingers of the right hand are laid on the second keys from the distal end of the key columns.

In FIG. 16, five groups of imaginary lateral series of keys each connected by a broken line 49-1 in the left key group and a broken line 49-2 in the right key group are those touched by fingers and thumb at the same time while not in typing motion. As shown in FIG. 17, the keys in both key groups are arranged with the consideration of the difference in the lengths of the fingers and the physical characteristics of the hand so that the sets of the imaginary lateral series of keys touched by the thumb and the fingers at the same time while not in typing motion do not form a straight line of the keys unlike in the traditional keyboard. Selected groups of imaginary lateral series of keys on which fingers rest at the same time have a small tactile marker on the surface of the keys (23, 25 and 27, respectively, in FIG. 15).

Figure 18:
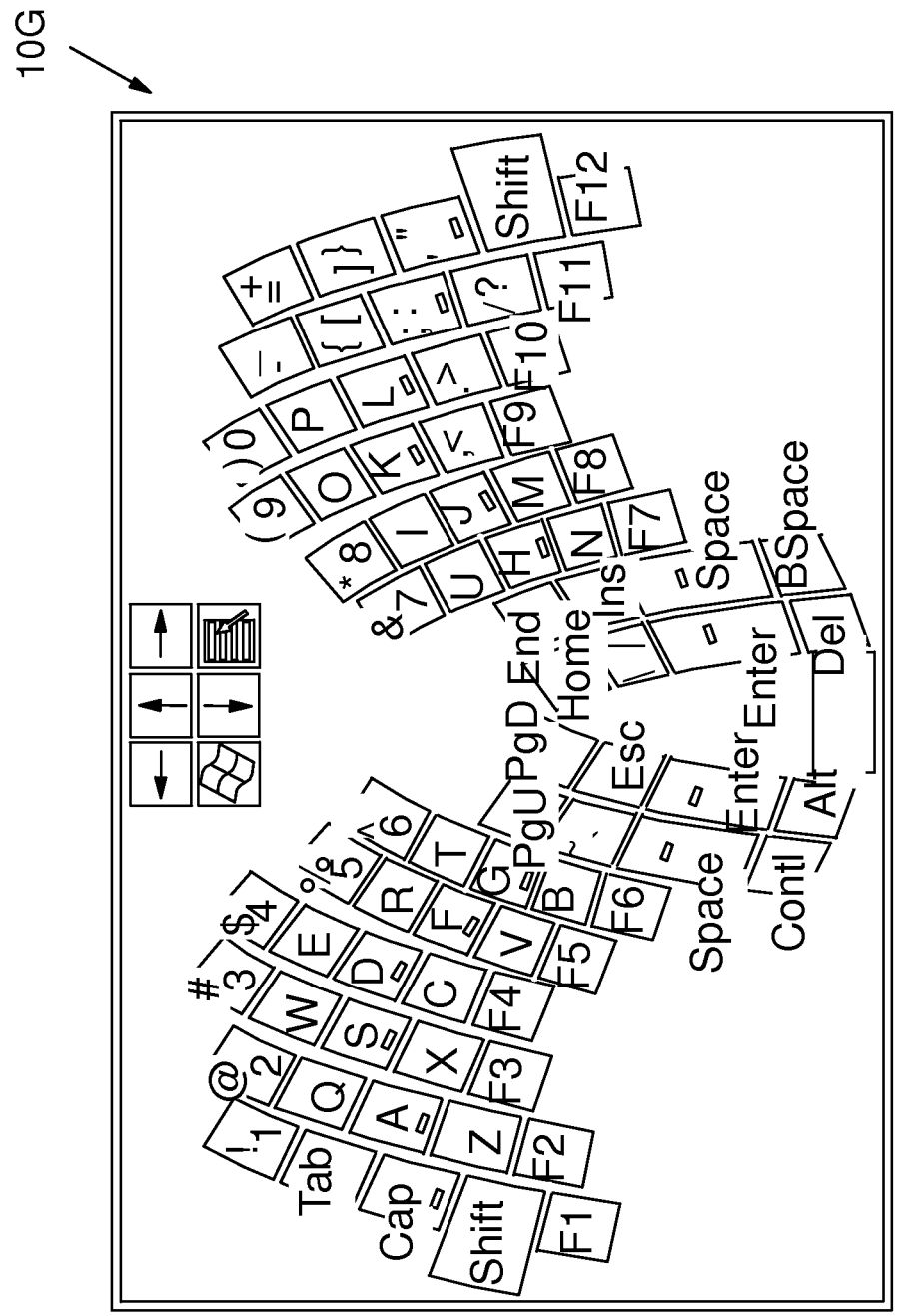
FIG. 18 is a top view of alternative embodiment G of the keyboard with example assignment of characters and functions to the keys.

FIG. 18 shows an example assignment of characters and functions to the keys that resembles that of the ordinary desktop US keyboard. Note that the letter assignment on the three sets of the imaginary lateral series of keys (among the aforementioned five sets of the imaginary lateral series of keys) generally follows that of the QWERTY keyboard of the conventional type keyboard.

As for the use of the voice/key interface with this keyboard, in the selection of applications and selection of sub-modes, the user will rely on the icons that appear on the computer screen. Also, in the selection of choices in the multiple selection stage of the Individual Application sub-mode, the user may use the on screen information, and thus the keyboard input is limited to text input. It must be apparent that the read out functionality of the inputted characters and words is not necessary because the user can see the inputted characters on the display.

An alternative embodiment (figure not presented) to this is a not-operable-in-motion version of the embodiment C described above. In the alternative version, the main body of the keyboard that is operable by two hands functions as the cover of the protective case for a tablet instead of a smartphone.

Double-Jointed Hinge for Mobile Keyboard/Computer

The same double-jointed hinge design used in alternative embodiment C is also used in alternative embodiment E of the present invention. Description of the double-jointed hinge below uses embodiment C, in which the double-jointed hinge connects the protection case 13 and the main body of the keyboard 10' for easier identification of related parts involved in the double-jointed hinge design. In embodiment E, the protection case 13 is replaced by the display 33 and the main body of the keyboard 10' is replaced by the main body of the keyboard 10'E.

Figure 19:
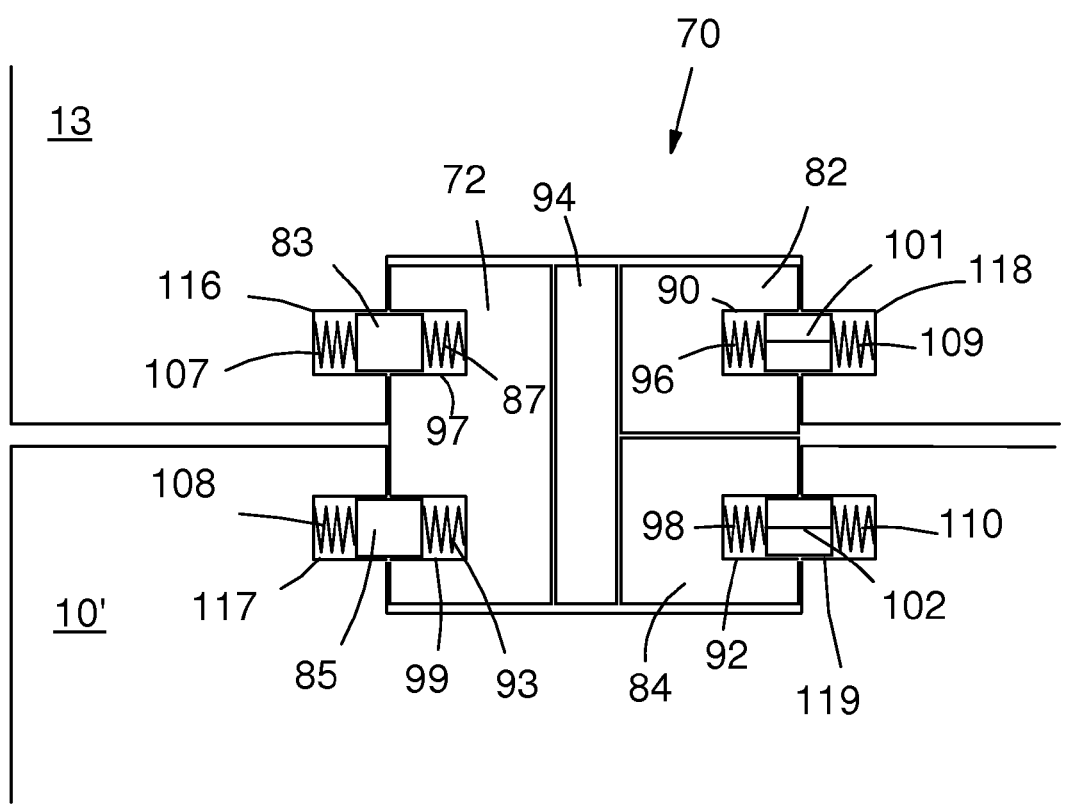
FIG. 19 is a schematic conceptual view showing the connection mechanisms of a double-jointed hinge in alternative embodiments C.
Figure 20:
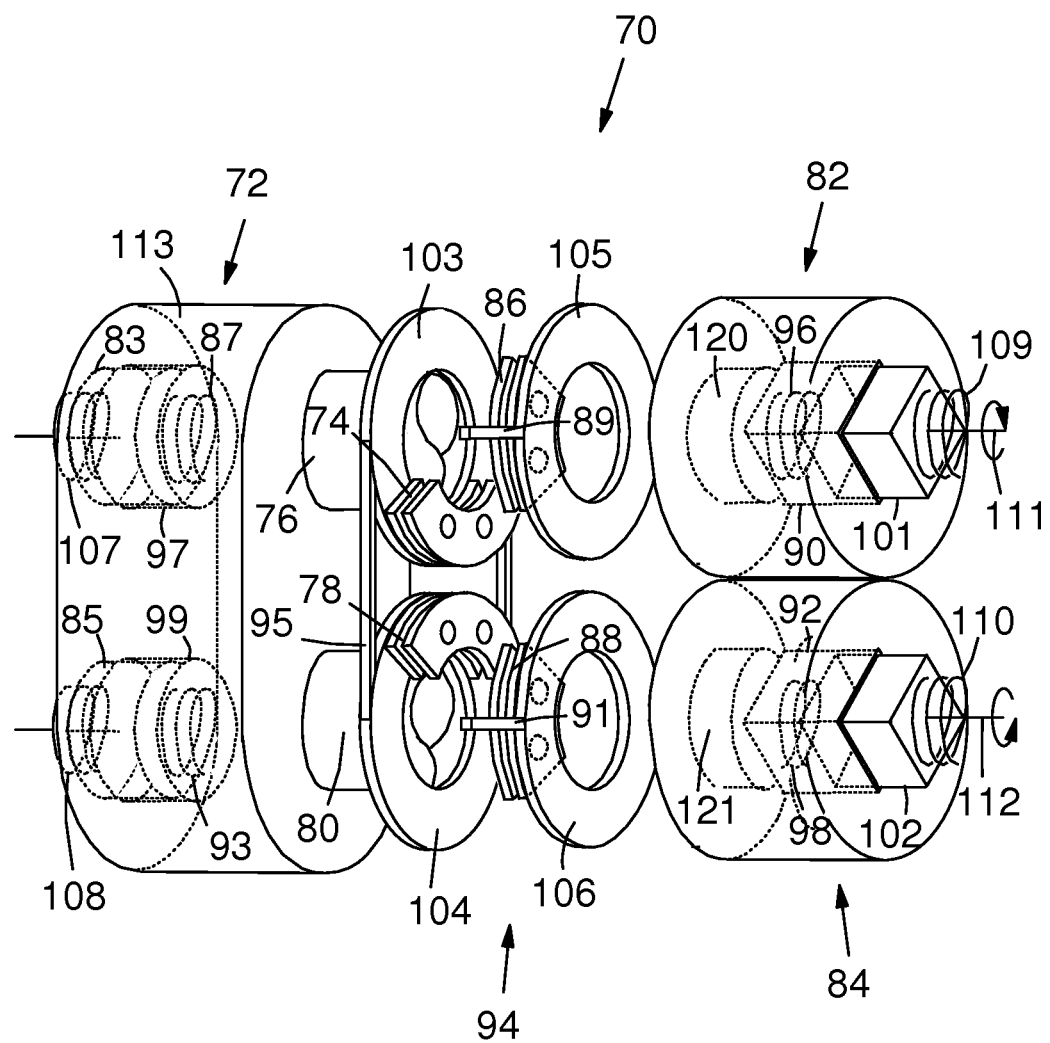
FIG. 20 is a perspective view of the double-jointed hinge that includes one conductor assembly.

In reference to FIGS. 19 and 20, the double-jointed hinge 70 comprises a dual hinge part 72, first rotary part 82, second rotary part 84 and at least one conductor assembly 94 wherein the conductor assembly 94 is sandwiched between the dual hinge part 72 and the two rotary parts 82 and 84. The dual hinge part 72 that is made of a non-conductive material is connected to the protective case 13 by a cylindrical column 83, and connected to the main body 10' of the mobile computer keyboard by a cylindrical column 85. The cylindrical column 83 is partially received in a cylindrical column hole 116 in the protective case 13 and received in a cylindrical column hole 97 in the dual hinge part 72, and is kept between the two holes by a spring 107 in the protective case and by a spring 87 in the dual hinge part, and in a similar manner, the cylindrical column 85 is received in a cylindrical column hole 117 in the main body 10' and partially received in a cylindrical column hole 99 in the dual hinge part 72, and is kept between the two holes by a spring 108 in the main body and by a spring 93 in the dual hinge.

The first rotary part 82 that is made of a non-conductive material is connected to the protective case 13 by a square column 101, and the second rotary part 84 that is made of a non-conductive material is connected to the main body 10' of the mobile keyboard by a square column 102. The square column 101 is received by a square column hole 118 in the protective case 13, and received by a square column hole 90 in the first rotary part 82, and is kept between the two holes by a spring 109 in the protective case 13 and a spring 96 in the first rotary part 82. In a similar manner, the square column 102 is received by a square column hole 119 in the main body 10' and received by a square column hole 92 of the second rotary part 84, and is kept between the two holes by a spring 110 in the main body and a spring 98 in the second rotary part 84.

The dual hinge part 72 and the first rotary part 82 are connected by cylindrical shaft 76 (see FIG. 20) that is affixed to the dual hinge part 72 and is slidably received by metal rings 103 and 105 of the conductor assembly 94, and a cylindrical hole 120 (see FIG. 20) in the first rotary part 82; and the dual-hinge part 72 and the second rotary part 84 are connected by cylindrical shaft 80 (see FIG. 20) that is affixed to the dual hinge part 72 and slidably received by metal rings 104 and 106 of the conductor assembly 94, and a cylindrical hole 121 (see FIG. 20) in the second rotary part 84. The cylindrical column 83, the cylindrical shaft 76, and the square column 101 share the pivotal axis 111, and the cylindrical column 85, the cylindrical shaft 80, and the square columns 102 share the pivotal axis 112.

In reference to FIG. 20, the conductor assembly 94 includes conductor assembly's dual-hinge part and first and second conductor rotary parts. The conductor dual hinge part includes a metal ring 103 affixed to a non-conductive internal wall of the dual hinge part 72 facing toward the first rotary parts 82; a quarter-part metal ring 74 that is affixed to the metal ring 103; a metal ring 104 placed next to a non-conductive internal wall of the dual hinge part 72 facing toward the second rotary parts 84; and a quarter-part metal ring 78 that is affixed to the metal ring 104. The metal rings 103 and 104 are connected by a conductor 95.

The conductor assembly's first rotary-part includes a metal ring 105 that is placed next to a non-conductive internal wall of the first rotary part 82 facing the metal ring 103; a quarter-part metal ring 86 that is affixed to the metal ring 105; and a conductor 89 that is affixed to the metal ring 105. The conductor assembly's second rotary part includes a metal ring 106 that is placed next to a non-conductive internal wall of the second rotary part 84 facing the metal ring 104, and a quarter-part metal ring 88 that is affixed to the metal ring 106; and a conductor 91 that is affixed to the metal ring 106. The conductor 89 is connected to the computer bus port of the protective case 13, and the conductor 91 is connected to the computer bus of the main body 10' of the keyboard.

The quarter-part ring 74 is a spring that pushes itself against the metal ring 105, and the quarter-part ring 86 is a spring that pushes itself against the metal ring 103; the quarter-part ring 78 is a spring that pushes itself against the metal ring 106; and the quarter-part ring 88 is a spring that pushes itself against the metal ring 104. The quarter-part rings 74, 78, 86, and 88; the metal rings 103, 104, 105, and 106; the conductors 95, 89, and 91 together form the conductor assembly 94 that enables the electrical current flow between the main body 10' of the keyboard and the protective case 13.

The opening angle of the protective case against the main body of the keyboard is kept at the desired level by keeping the pressure given by the quarter-part metal rings 74 and 86 to a desired level, and the pressure given by the quarter-part metal rings 78 and 88 to a desired level. The strengths of the springs 78 and 88 can be kept stronger than the strengths of the springs 74 and 86 such that when the protective case 13 is opened, only the protective case 13 opens and the computer's main body 11 remain in the same position. When the protective case 13 is opened further, and reaches 180 degrees from the original closed position, and if the user tries to turn the protective case 13 further, the quarter part rings 78 and 88 start to slide against the metal rings 106 and 104, respectively.

Figure 21:
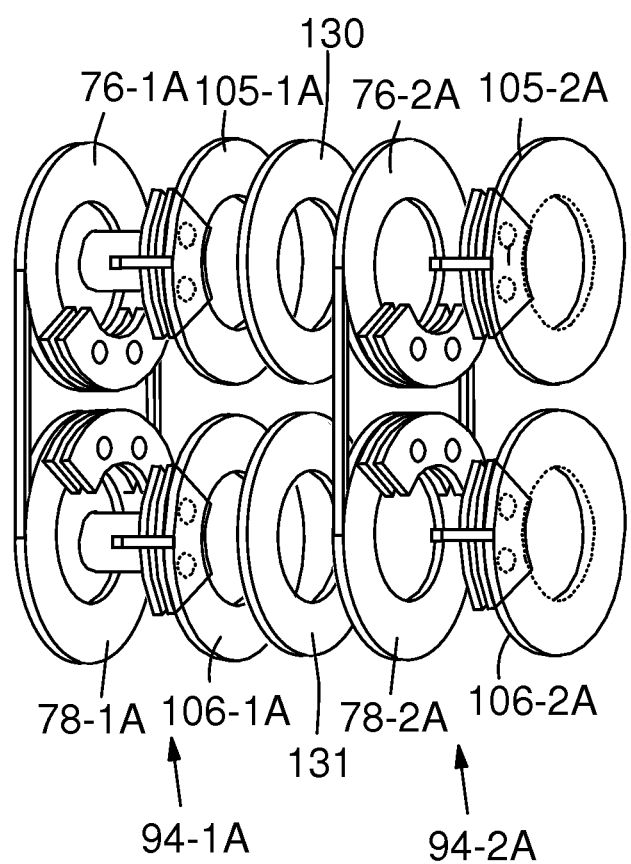
FIG. 21 is a perspective view of the conductor assemblies.

FIG. 21 shows two conductor assemblies 94-1A and 94-2A, each of which is physically identical to the conductor assembly 94, with a pair of rings 130 and 131 that are made of a non-conductive material inserted between them. The metal rings 76-1A and 78-1A are connected together by a conductor, and the metal rings 76-2A and 78-2A are connected together by a conductor so that these metal rings will not pivot as the protective case 13 is opened and/or closed. The metal rings 105-1A and 105-2A are affixed to the protective case 13, and thus it pivots as the protective case 13 is opened and/or closed, and the metal rings 106-1A and 106-2A are affixed to the main body of the keyboard 10', and thus it pivots as the protective case 13 is opened and/or closed. In practice, the total number of conductor assemblies required per keyboard will be at least four (as in the USB port), and as many as probably 6 (as in Microsoft's Surface Pro 2). If two double-jointed hinges are used per keyboard, 2 to 3 conductor assemblies per double-jointed hinge will become necessary. In a double-jointed hinge that includes a plurality of conductor assemblies, a pair of rings made of non-conductive material is placed between neighboring the conductor assemblies as done in the two-conductor assembly case shown in FIG. 21.

In referring to FIGS. 22-A through 22-E that shows a series of cross sectional views of the conductor assembly 94 between the dual-hinge part 72 and the two rotary parts 82 and 84, and more specifically the relationships between the quarter-part rings 74, 86, 78 and 88 and the opening angle of the protective case 13 against the main body 10' of the computer. As shown in FIG. 22-A through FIG. 22-E, the quarter-part rings 74 and 78 that are affixed to the metal rings 103 and 104, respectively, remain in the same location. As shown in FIG. 22-A, when the protective case 13 is in the closed position, the quarter-part ring 86 of the first rotary part 82 is touching the quarter-part ring 74 and the quarter-part ring 88 is touching the quarter-part ring 78. As the protective case 13 is opened by 90 degrees, the quarter-part ring 86 has rotated 90 degrees to a position that is diametrically opposite to that of the quarter-part ring 74. As the protective case 13 is opened by 180 degrees, the quart-part ring 86 has rotated 180 degrees to the position that is touching the other side of the quarter-part ring 74 while the quarter-part ring 78 is still at the same position as when the protective case 13 has not been opened as in FIG. 22-A. As the protective case is opened 360 degrees from the closed position as shown in FIG. 22-E, the quarter-part ring 88 too has rotated 180 degrees to the position that is touching the other end of the non-rotatable quarter-part ring 78.

An alternative design of the double-jointed hinge includes an alternative design of the conductor assembly that includes a conductor assembly comprising conductor assembly's dual hinge part. The conductor assembly's dual-hinge part includes a pair of a plurality of coaxial metal rings and corresponding coaxial quarter-part metal rings wherein each of which quarter-part metal rings is affixed to the coaxial metal ring. The corresponding pair of the coaxial metal rings of the dual-hinge part is connected together by a conductor. The dual hinge part of the conductor assembly is affixed to dual hinge part of the double-jointed hinge. The conductor assembly's rotary part includes first and second rotary subparts each of which comprises a plurality of coaxial metal rings and corresponding coaxial quarter-part metal rings that are wherein each of which quarter-part metal rings is affixed to the corresponding coaxial metal ring. The first rotary part of the conductor assembly is affixed to the first rotary part of the double-jointed hinge, and the second rotary part of the conductor assembly is affixed to the second rotary part of the double-jointed hinge. Each of the coaxial metal rings of the first rotary part is connected to a conductor, which in turn is connected to the protection cover 13, and each of the coaxial metal rings of the first rotary part is connected to a conductor, which in turn is connected to the main body of the keyboard 10' in embodiment C. This alternative embodiment of the double-jointed hinge will best fit to laptops and tablets in which the computers have much thicker bodies.

This invention having been described in detail in accordance with the requirements of the US Patent Statutes, various other changes and modifications will suggest themselves to those skilled in this art. For example, in the construction of the dual-switch key design, any types of switching mechanism may be used as long as it satisfies the objective; the keyboard may have a means for holding it on the belt such as a metal clip or a belt loop, and two of the keyboards with a holding means on the belt, one for the left hand use and one for the right hand use, may be connected together and used as an in-motion operable input device; or a keyboard not operable in motion may be split into two parts one for the right hand and the other for the left hand. It is intended that these and other minor changes and modifications shall fall within the scope of the invention defined in the appended claims. The details of hardware and possible software are not described here except for the simplified description of the dual-switch key design and limited description of voice/key interface software. It is understood that for those skilled in this art detailed description of the design of the required hardware and software for this keyboard is not necessary.

I claim:

1. A computer keyboard operable in motion including a plurality of keys and control circuitry wherein
    said keyboard is operable in conjunction with a computer, or is a part of a computer wherein said computer is a device that includes a central processing unit, memory and storage medium,
    the use of said keyboard includes inputting text,
    said keys are touch perceivable,
    said keys form a plurality of key columns,
    each of said key column is assigned to a specific finger or thumb of a hand,
    each of said key columns has a plurality of said keys,
    said key columns can be straight or curved,
    arrangement of said keys reflect general physical characteristics of human hand wherein said general physical characteristics of human hand implies different lengths of fingers, and thus
    a series of said keys on which said user is expected to put said user's finger tips while said user's fingers are in resting positions do not form a straight row,
    said key columns include at least one key column assigned to index finger,
    said key columns include at least one key column assigned to middle finger,
    said key columns include at least one key column assigned to ring finger,
    said key columns include at least one key column assigned to little finger, and
    key in the most distal end of said key column assigned to middle finger is located at distally farther location than the key in the most distal end of said key column assigned to little finger.

2. A computer keyboard operable in motion including a plurality of keys and control circuitry wherein
    said computer keyboard is operable in conjunction with a computer, or is a part of a computer to which said keyboard is affixed wherein said computer is a smartphone or a smart wearable wherein
    to each of said keys, a plurality of keyed-in-elements including a logo of an app, a function, a character, and nothing are assigned, wherein a function is an operating means such as, for example, "go back" and "next,
    said keyed-in-elements of same kind are made activatable at the same time, and a time duration during which said same kind of said-keyed-in-element are made activatable is called a phase,
    in one of said phases in which the use of said logos of apps are made activatable, said keys that make said logos of apps activatable play the role of icons displayed on a display screen of said smartphone or smart wearable, and pressing of one of said keys to which one of said logos of apps is assigned will activate relevant one of said apps,
    said keyboard includes at least one button assigned to switch between said plurality of phases,
    switching method between said plurality of phases includes pressing said at least one button assigned for it,
    said computer includes software for pronouncing name of a character or a function or an app currently assigned to each of said keys,
    said keyboard includes a means for finding name of a character or a function or an app currently assigned for any of said key chosen by user of said keyboard,
    said means for finding name of a character or a function or an app includes a button, and
    when user presses any of said keys while said button is in "on" state, said computer pronounces name of a character or a function or an app assigned to said keys.

3. A computer keyboard as defined in claim 2 wherein
    said computer is operated in a plurality of interface modes including visual/touch interface mode and voice/key interface mode wherein
    in said visual/touch interface mode, user looks at the screen of said computer and touches said screen to communicate with said computer,
    in said voice/key interface mode, user uses said keys and said computer uses voice to communicate each other, and
    switching method between said plurality of interface mode includes pressing a button assigned for it.

4. A computer keyboard as defined in claim 2 wherein
    said keys in said keyboard are made of a dual-switch key design wherein each of said keys includes first and second switches wherein
    said first switch closes first electric circuit, and
    said second switch closes second electric circuit.

5. A computer keyboard as defined in claim 4 wherein
    when user of said keyboard presses a key with a light force, said first electric circuit is closed, and a computer to which said keyboard is connected pronounces name of character/function or logo/pictograph that is currently assigned to said key.

6. A computer keyboard as defined in claim 2 wherein said keyboard is worn on a hand.

7. A computer keyboard as defined in claim 6 wherein
    said keyboard is produced using 3-D measurement technology and at least partially using 3-D printing technology.

8. A computer keyboard as defined in claim 2 wherein
said computer includes software for voice/key interface wherein said computer uses voice and user uses said keys to interface each other, and
said keys are used to operate said computer with said voice/key interface and to input text.

9. A computer keyboard as defined in claim 2 wherein
said computer is a smartphone,
said keyboard includes a main body of said keyboard, a protective case in which said computer is at least partially enclosed, and at least one double-jointed hinge connecting said main body and said protective case wherein
said computer includes a computer bus port,
said main body includes a plurality of keys and control circuitry,
said protective case includes a plurality of computer bus pins that plug into said computer bus port of said computer, and
said main body of said keyboard and said computer are connected by said computer bus.

10. A computer keyboard as defined in claim 2 wherein
said keys are touch perceivable,
said keys form a plurality of longitudinally extending key columns generally in direction of fingers alignment of user,
each of said key column is assigned to a specific finger or thumb of a hand,
each of said key columns include a plurality of said keys,
said key columns can be straight or curved, and
when user of said keyboard puts his/her fingers on a lateral series of said keys while said user's fingers are in resting positions, said lateral series of said keys do not form a straight row of said keys.

11. A computer keyboard as defined in claim 2 wherein
said keyboard is made of two separate parts wherein one of said parts is used by left hand and the other of said parts is used by right hand.

12. A computer keyboard as defined in claim 11 wherein
in each of said two separate parts of said keyboard, said top surfaces of said keys of at least one of said key columns have a groove or a bump that extends along said key column.

13. A computer keyboard as defined in claim 11 wherein
said computer includes software for voice/key interface wherein said voice/key interface is a type of user interface in which said computer uses voice and user uses said keys to interface each other, and
said keys are used to operate said computer with said voice/key interface and to input text.

14. A computer keyboard as defined in claim 2 wherein
said keys in said keyboard are made of a dual-switch key design wherein each of said keys includes first and second switches wherein
said first switch closes first electric circuit, and
said second switch closes second electric circuit.

15. A computer keyboard as defined in claim 14 wherein
when user of said keyboard presses a key with a light force, said first electric circuit is closed, and said computer to which said keyboard is connected pronounces name of character/function or logo/pictograph that is currently assigned to said key.

16. A mobile computer operable in motion including a central processor unit, random access memory, a data storage medium, operating system, application software, a keyboard including a plurality of keys and control circuitry, a display unit, and communication means wherein
the use of said keyboard includes inputting text,
said keys are touch perceivable,
said keys form a plurality of key columns,
each of said key column is assigned to a specific finger or thumb of a hand,
each of said key columns has a plurality of said keys,
said key columns can be straight or curved,
arrangement of said keys reflect general physical characteristics of human hand wherein said general physical characteristics of human hand implies different lengths of fingers, and thus
a series of said keys on which said user is expected to put said user's finger tips while said user's fingers are in resting positions do not form a straight row,
said key columns include at least one key column assigned to index finger,
said key columns include at least one key column assigned to middle finger,
said key columns include at least one key column assigned to ring finger,
said key columns include at least one key column assigned to little finger, and
key in the most distal end of said key column assigned to middle finger is located at distally farther location than the key in the most distal end of said key column assigned to little finger.

17. A mobile computer operable in motion including a keyboard that includes a plurality of keys and control circuitry, and communication means wherein
said computer is a smartphone or a smart wearable, wherein
to each of said keys, a plurality of keyed-in-elements including a logo of an app, a function, a character, and nothing are assigned, wherein a function is an operating means such as, for example, "go back" and "next,
said keyed-in-elements of same kind are made activatable at the same time, and a time duration during which said same kind of said-keyed-in-element are made activatable is called a phase,
in one of said phases in which the use of said logos of apps are made activatable, said keys that make said logos of apps activatable play the role of icons displayed on a display screen of said smartphone or smart wearable, and pressing of one of said keys to which one of said logos of apps is assigned will activate relevant one of said apps,
said keyboard includes at least one button assigned to switch between said plurality of phases,
switching method between said plurality of phases includes pressing said at least one button assigned for it,
said mobile computer includes software for voice/key interface wherein said computer uses voice and user uses said keys to interface each other, and
said keys are used to operate said computer with said voice/key interface and to input text.

18. A mobile computer as defined in claim 17 wherein
said mobile computer is operated in a plurality of interface modes including visual/touch interface mode and voice/key interface mode wherein
in said visual/touch interface mode user looks at the screen of said computer and touches said screen to communicate with said computer, and in said voice/key interface mode user uses said keys and said computer uses voice to communicate each other, and
switching method between said plurality of interface mode includes pressing a button assigned for it.

19. A mobile computer as defined in claim 17 wherein
said voice/key interface mode includes a sub-mode called Voice-Key Talk, and
in said Voice-Key Talk, user types in words, and said mobile computer replies in human-like voice to communicate each other.

20. A mobile computer as defined in claim 17 wherein
said voice/key interface mode includes a sub-mode called Shortcuts,
said Shortcuts includes shortcuts IDs, and
as user key inputs a shortcuts ID, said mobile computer takes to a corresponding location of said application software in said mobile computer.

21. A mobile computer as defined in claim 17 wherein
said mobile computer is worn on a hand.

22. A mobile computer operable in motion as defined in claim 17 including a keyboard including a plurality of keys and control circuitry, a display unit, and communication means—wherein
said mobile computer is a smartphone,
said mobile computer comprises a part including said display unit and a part including said keyboard,
said part including said display unit and said part including said keyboard are connected by at least one double-jointed hinge,
said mobile computer may be used in two physical modes but in three ways while in operation wherein in said one mode, said display unit and said keyboard are facing back to back, and in said another mode, said display unit and said keyboard are facing direction viewable by user of said mobile computer, and
in first of said three ways of operation, user operates said computer by touching-and-swiping while said user looking at said display unit,
in second of said three ways of operation, user operates said mobile computer by using said keyboard alone without having to looking said display unit, and
in third of said three ways of operation, user operates said mobile computer using both said display unit and said keyboard.

23. A mobile computer as defined in claim 22 wherein
the use of said keyboard includes inputting text,
said keys are touch perceivable,
said keys form a plurality of key columns,
each of said key column is assigned to a specific finger or thumb of a hand,
said key columns can be straight or curved.

24. A mobile computer as defined in claim 21 wherein
said keyboard is produced using 3-D measurement technology and at least partially using 3-D printing technology.

25. A mobile computer as defined in claim 23 wherein
said key columns include at least one key column assigned to index finger,
said key columns include at least one key column assigned to middle finger,
said key columns include at least one key column assigned to ring finger, and
said key columns include at least one key column assigned to little finger.

26. A mobile computer as defined in claim 17 wherein
said mobile computer includes software for pronouncing name of a character or a function or an app currently assigned to each of said keys,
said keyboard includes a means for finding name of a character or a function or an app currently assigned for any of said key chosen by user of said keyboard, and
said means for finding name of a character or a function or an app includes a button, and when user presses any of said keys while said button is in "on" state, said computer pronounces name of a character or a function or an app assigned to said keys.

27. A mobile computer as defined in claim 17 wherein
said voice/key interface mode includes a sub-mode called Shortcuts,
said Shortcuts includes shortcuts IDs, and
when user key inputs an appropriate shortcuts ID, said mobile computer executes a macro defined by said shortcuts ID.

28. A mobile computer as defined in claim 17 wherein
said keys in said mobile computer are a made of a dual-switch key design wherein each of said keys includes first and second switches wherein
said first switch closes first electric circuit, and
said second switch closes second electric circuit.

29. A mobile computer as defined in claim 28 wherein
when user of said mobile computer presses a key with a light force, said first electric circuit is closed, and said mobile computer to which said keyboard is connected pronounces name of character/function or logo/pictograph that is assigned to said key.

30. A computer keyboard as defined in claim 1 wherein
said top surfaces of said keys in each of said key columns are shaped concave along said key column so that the tip of user's finger should be able to smoothly slide on said top surface of said keys along said key column, and
said top surfaces of said keys of at least one of said key columns have a groove or a bump that extends along said key column.

31. A computer keyboard as defined in claim 1 wherein
said computer includes software for voice/key interface wherein said computer uses voice and user uses said keys to interface each other, and
said keys are used to operate said computer with said voice/key interface and to input text.

32. A computer keyboard as defined in claim 1 wherein
said computer includes software for pronouncing name of a character or a function or an app currently assigned to each of said keys,
said keyboard includes a means for finding name of a character or a function or an app for any of said key chosen by user of said keyboard wherein
said means for finding name of a character or a function or an app includes a button, and
when said user presses any of said keys while said button is in "on" state, said computer pronounces name of a character or a function or an app assigned to said keys.

33. A computer keyboard as defined in claim 1 wherein
said keyboard is made of two separate parts wherein one of said parts is used by left hand and the other of said parts is used by right hand.

34. A computer keyboard as defined in claim 1 wherein
said keys in said keyboard are made of a dual-switch key design wherein each of said keys includes first and second switches wherein
said first switch closes first electric circuit, and
said second switch closes second electric circuit.

35. A computer keyboard as defined in claim 34 wherein
when user of said keyboard presses a key with a light force, said first electric circuit is closed, and a computer to which said keyboard is connected pronounces name of a character/function or a logo/pictograph that is currently assigned to said key.

36. A computer keyboard as defined in claim 1 wherein said keyboard is worn on a hand.

37. A computer keyboard as defined in claim 36 wherein said keyboard is produced using 3-D measurement technology and/or at least partially using 3-D printing technology.

38. A computer keyboard as defined in claim 36 wherein said computer includes software for voice/key interface wherein said computer uses voice and user of said computer uses said keys to interface each other, and said keys are used to operate said computer with said voice/key interface and to input text.

39. A mobile computer as defined in claim 16 wherein said mobile computer includes software for voice/key interface wherein said computer uses voice and user uses said keys to interface each other, and said keys are used to operate said computer with said voice/key interface and to input text.

40. A mobile computer as defined in claim 16 wherein said top surfaces of said keys in each of said key columns may be shaped concave along said key column so that the tip of user's finger should be able to smoothly slide on said top surface of said keys along said key column, and said top surfaces of said keys of at least one of said key columns have a groove or a bump that extends along said key column.

41. A mobile computer as defined in claim 16 wherein said computer includes software for pronouncing name of a character or a function or an app currently assigned to each of said keys, and said keyboard includes a means for finding name of a character or a function or an app for any of said key chosen by user of said keyboard wherein said means for finding name of a character or a function or an app includes a button, and when user presses any of said keys while said button is in "on" state, said computer pronounces name of a character or a function or an app assigned to said keys.

42. A mobile computer as defined in claim 16 wherein said keyboard is made of two separate parts wherein one of said parts is used by left hand and the other of said parts is used by right hand.

43. A mobile computer as defined in claim 16 wherein said keys in said mobile computer are a made of a dual-switch key design wherein each of said keys includes first and second switches wherein said first switch closes first electric circuit, and said second switch closes second electric circuit.

44. A mobile computer as defined in claim 43 wherein when user of said mobile computer presses a key with a light force, said first electric circuit is closed, and said mobile computer pronounces name of a character/function or a logo/pictograph that is assigned to said key.

45. A mobile computer as defined in claim 16 wherein said mobile computer is worn on a hand.

46. A mobile computer as defined in claim 45 wherein said mobile computer is produced using 3-D measurement technology and/or at least partially using 3-D printing technology.

47. A mobile computer as defined in claim 45 wherein said mobile computer includes software for voice/key interface wherein said mobile computer uses voice and user of said mobile computer uses said keys to interface each other, and said keys are used to operate said computer with said voice/key interface and to input text.

48. A mobile computer as defined in claim 45 wherein said mobile computer includes software for pronouncing name of a character or a function currently assigned to each of said keys, and said mobile computer includes a means for finding name of a character or a function or an app for any of said key chosen by user of said keyboard wherein said means for finding name of a character or a function or an app includes a button, and when user of said mobile computer presses any of said keys while said button is in "on" state, said computer pronounces name of a character or a function or an app assigned to said keys.

* * * * *